US012515132B2

(12) United States Patent
Guo et al.

(10) Patent No.: US 12,515,132 B2
(45) Date of Patent: Jan. 6, 2026

(54) CONTROLLING METHOD AND APPARATUS OF VIRTUAL ACTOR, STORAGE MEDIUM AND ELECTRONIC DEVICE

(71) Applicant: TENCENT TECHNOLOGY (SHENZHEN) COMPANY LIMITED, Shenzhen (CN)

(72) Inventors: Xin Guo, Shenzhen (CN); Ning Ni, Shenzhen (CN); Yi Huang, Shenzhen (CN); Shengwei Shi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 192 days.

(21) Appl. No.: 18/332,367

(22) Filed: Jun. 9, 2023

(65) Prior Publication Data

US 2023/0347248 A1 Nov. 2, 2023

Related U.S. Application Data

(63) Continuation of application No. PCT/CN2022/101715, filed on Jun. 28, 2022.

(30) Foreign Application Priority Data

Jul. 30, 2021 (CN) ......................... 202110874354.9

(51) Int. Cl.
*A63F 13/56* (2014.01)
*A63F 13/537* (2014.01)
*A63F 13/577* (2014.01)

(52) U.S. Cl.
CPC ............ *A63F 13/56* (2014.09); *A63F 13/537* (2014.09); *A63F 13/577* (2014.09)

(58) Field of Classification Search
CPC ....... A63F 13/577; A63F 13/537; A63F 13/56
See application file for complete search history.

(56) References Cited

U.S. PATENT DOCUMENTS 11,794,107 B2 * 10/2023 Kutcher .................. A63F 13/56
2002/0019257 A1 2/2002 Koizumi et al.
(Continued)

FOREIGN PATENT DOCUMENTS

CN 110681156 A 1/2020
CN 111068324 A 4/2020
(Continued)

OTHER PUBLICATIONS

The World Intellectual Property Organization (WIPO) International Search Report for PCT/CN2022/101715 Sep. 2, 2022 8 Pages (including translation).
(Continued)

*Primary Examiner* — Reginald A Renwick
(74) *Attorney, Agent, or Firm* — Anova Law Group, PLLC

(57) ABSTRACT

A controlling method includes: displaying a game screen, the game screen including a target virtual actor and a target virtual wall; controlling the target virtual actor to climb onto the target virtual wall, in response to a first operation instruction executed on the target virtual actor when the target virtual actor faces the target virtual wall and a distance between the target virtual actor and the target virtual wall is less than a first threshold; and controlling the target virtual actor to climb on the target virtual wall in a climb direction indicated by the second operation instruction, in response to a second operation instruction executed on the target virtual actor when the target virtual actor is located on the target virtual wall.

18 Claims, 19 Drawing Sheets

(56) References Cited

U.S. PATENT DOCUMENTS

| | | | | |
|---|---|---|---|---|
| 2012/0052938 | A1 | 3/2012 | Glancy et al. | |
| 2018/0056183 | A1* | 3/2018 | Tezuka | A63F 13/56 |
| 2021/0236932 | A1* | 8/2021 | Perez | G06T 13/40 |
| 2023/0347248 | A1 | 11/2023 | Guo et al. | |

FOREIGN PATENT DOCUMENTS

| | | | |
|---|---|---|---|
| CN | 112316429 | A | 2/2021 |
| CN | 113559516 | A | 10/2021 |
| CN | 113577763 | A | 11/2021 |

OTHER PUBLICATIONS

Intellectual Property Office of SINGAPORE Written Opinion for Application No. 11202306419R Nov. 21, 2025 6 pages.

* cited by examiner

CONTROLLING METHOD AND APPARATUS OF VIRTUAL ACTOR, STORAGE MEDIUM AND ELECTRONIC DEVICE

CROSS-REFERENCES TO RELATED APPLICATIONS

This application is a continuation application of PCT Patent Application No. PCT/CN2022/101715, entitled "VIRTUAL ROLE CONTROL METHOD AND APPARATUS, STORAGE MEDIUM, AND ELECTRONIC DEVICE" and filed on Jun. 28, 2022, which claims priority to Chinese Patent Application No. 202110874354.9, entitled "CONTROLLING METHOD AND APPARATUS OF VIRTUAL ACTOR, STORAGE MEDIUM AND ELECTRONIC DEVICE" filed with the China National Intellectual Property Administration on Jul. 30, 2021, the entire contents of both of which are incorporated herein by reference.

FIELD OF THE TECHNOLOGY

The present disclosure relates to the field of computers, and in particular to a controlling method and apparatus of a virtual actor, a storage medium and an electronic device.

BACKGROUND OF THE DISCLOSURE

At present, in a game application, if a virtual wall is encountered during a process that a player controls a virtual actor to move, it is necessary to control the virtual actor to bypass the virtual wall and move. Further, if the player wants the virtual actor to climb to a position with a preset height, it is necessary to control the virtual actor to pass through a certain length of virtual stairs, or jump on multiple hanging virtual tables with height differences. Whether the above-mentioned operation mode with the virtual stairs or the operation mode of multiple jumps, the complexity of controlling the virtual actor is increased and the control efficiency of the virtual actor is reduced.

For the above-mentioned problems, no effective solution has been provided yet.

SUMMARY

Embodiments of the present disclosure provide a controlling method and apparatus of a virtual actor, a storage medium and an electronic device to at least solve the technical problem that the control efficiency of the virtual actor in the related art is relatively low.

According to one aspect of this embodiment of the present disclosure, there is provided a controlling method of a virtual actor, including: displaying a game screen, the game screen including a target virtual actor and a target virtual wall; controlling the target virtual actor to climb onto the target virtual wall, in response to a first operation instruction executed on the target virtual actor when the target virtual actor faces the target virtual wall and a distance between the target virtual actor and the target virtual wall is less than a first threshold; and controlling the target virtual actor to climb on the target virtual wall in a climb direction indicated by the second operation instruction, in response to a second operation instruction executed on the target virtual actor when the target virtual actor is located on the target virtual wall.

According to another aspect of this embodiment of the present disclosure, there is further provided a controlling apparatus of a virtual actor, including: a display module, configured to display a game screen, the game screen including a target virtual actor and a target virtual wall; a first control module, configured to control the target virtual actor to climb onto the target virtual wall, in response to a first operation instruction executed on the target virtual actor when the target virtual actor faces the target virtual wall and a distance between the target virtual actor and the target virtual wall is less than a first threshold; and a second control module, configured to control the target virtual actor to climb on the target virtual wall in a climb direction indicated by the second operation instruction, in response to a second operation instruction executed on the target virtual actor when the target virtual actor is located on the target virtual wall.

According to yet another aspect of this embodiment of the present disclosure, there is further provided a non-transitory computer-readable storage medium. The computer-readable storage medium stores a computer program therein. The computer program is set to perform the above-mentioned controlling method of the virtual actor at runtime.

According to yet another aspect of this embodiment of the present disclosure, there is further provided an electronic device, including a memory and processor. The above-mentioned memory stores a computer program therein. The above-mentioned processor is set to perform the above-mentioned controlling method of the virtual actor by the computer program.

In this embodiment of the present disclosure, by executing corresponding operation instructions under certain conditions, the virtual actor can be controlled to climb onto the virtual wall, so as to avoid that the virtual actor can climb to a position with a preset height only by, for example, the operation mode of taking the stairs or jumping for multiple times when encountering the virtual wall, which solves the technical problem that the control efficiency of the virtual actor in the related art is low.

BRIEF DESCRIPTION OF THE DRAWINGS

The attached drawings described here are intended to provide a further understanding of the present disclosure, forming a part of the application. The schematic embodiments and descriptions of the present disclosure are intended to explain the present disclosure and do not constitute an improper limitation of the present disclosure. In the drawings.

DESCRIPTION OF EMBODIMENTS

In order to enable the persons skilled in the art to better understand the application scheme, the technical solutions in embodiments of the present disclosure are clearly and completely described below with reference to the accompanying drawings in the embodiments of the present disclosure. Apparently, the described embodiments are merely some rather than all of the embodiments of the present disclosure. All other embodiments obtained by those of ordinary skill in the art based on the embodiments of the present disclosure without making creative efforts shall fall within the protection scope of the present disclosure.

The terms "first" and "second" in DESCRIPTION and CLAIMS and THE DRAWINGS of the present disclosure are intended to distinguish similar objects, but not to describe a specific order or sequence. It is to be understood that data used in this way can be interchanged where appropriate, so that the embodiments of the present disclosure described here can be implemented in order other than those illustrated or described here. Furthermore, the terms "include" and "have" and any variations thereof are intended to cover non-exclusive inclusion. For example, a process, method, system, product or device that includes a series of steps or units need not be limited to those steps or units that are clearly listed, but may include other steps or units that are not clearly listed or are inherent for these processes, methods, products or devices.

First, some terms appearing in the process of describing the embodiments of the present disclosure are suitable for the following interpretations:

Climb: in the game, the player controls the actor to climb along the wall;

Little jump: in a climb end state, the player controls the actor to jump in a small range of displacement; and Hang: after the climb is completed, the player controls the actor to hang his/her hands on the edge of the wall.

Figure 1:
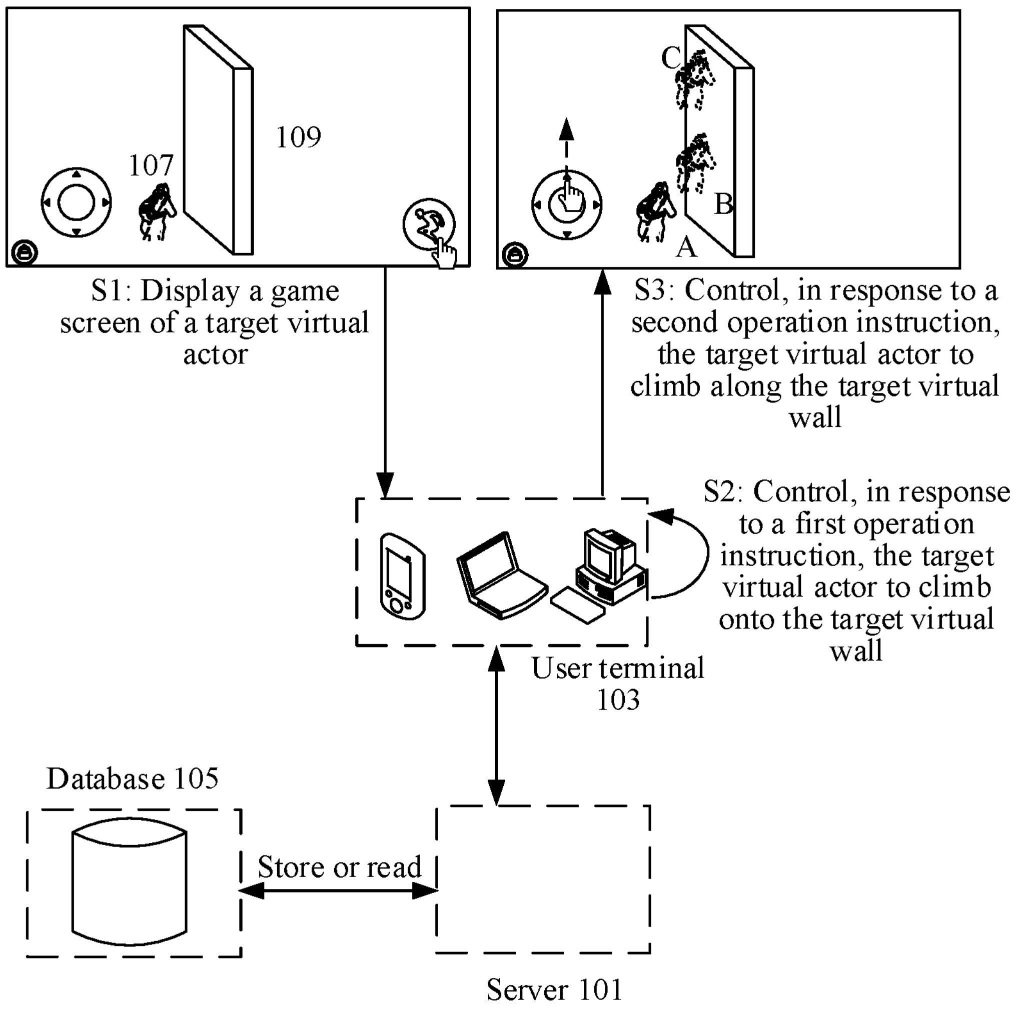
FIG. 1 is a schematic diagram of an application environment of a controlling method of a virtual actor according to an embodiment of the present disclosure.

The present disclosure is described below in conjunction with the embodiments:

According to one aspect of this embodiment of the present disclosure, there is provided a controlling method of a virtual actor. In this embodiment, the above-mentioned controlling method of the virtual actor can be applied to a hardware environment composed of a server 101 and a user terminal 103 as shown in FIG. 1. As shown in FIG. 1, the server 101 is connected with the terminal 103 via a network, such that services can be provided for the user terminal or a client installed on the user terminal. The client may be a video client, an instant messaging client, a browser client, an education client, a game client, etc. A database 105 can be provided on the server or independently of the server to provide data storage services for the server 101, for example, a game data storage service. The above-mentioned network may include, but is not limited to: a wired network and a wireless network, where the wired network includes: a local area network, a metropolitan area network and a wide area network, and the wireless network includes: Bluetooth, WIFI and other networks that enable wireless communication. The user terminal 103 may be a terminal configured with an application program, and may include, but is not limited to, at least one of: computer devices such as mobile phones (such as an Android phone and an iOS phone), laptops, tablets, hand-held computers, mobile Internet devices (MID), PAD, desktop computers and smart televisions. The above-mentioned server may be a single server, or may be a server cluster composed of multiple servers, or a cloud server. A target game application using the above-mentioned controlling method of the virtual actor is displayed by the user terminal 103.

In conjunction with FIG. 1, the above-mentioned controlling method of the virtual actor can be implemented at the user terminal 103 through the following steps:

S1: Display a game screen, the game screen including a target virtual actor and a target virtual wall;

S2: Control, in response to a first operation instruction executed on the target virtual actor, the target virtual actor to climb onto the target virtual wall, when the target virtual actor faces the target virtual wall, and the distance between the target virtual actor and the target virtual wall is less than a first threshold; and

S3: Control, in response to a second operation instruction executed on the target virtual actor, the target virtual actor to climb on the target virtual wall in a climb direction indicated by the second operation instruction, when the target virtual actor is located on the target virtual wall.

The above is only an example, which will not be specifically limited in this embodiment.

Figure 2:
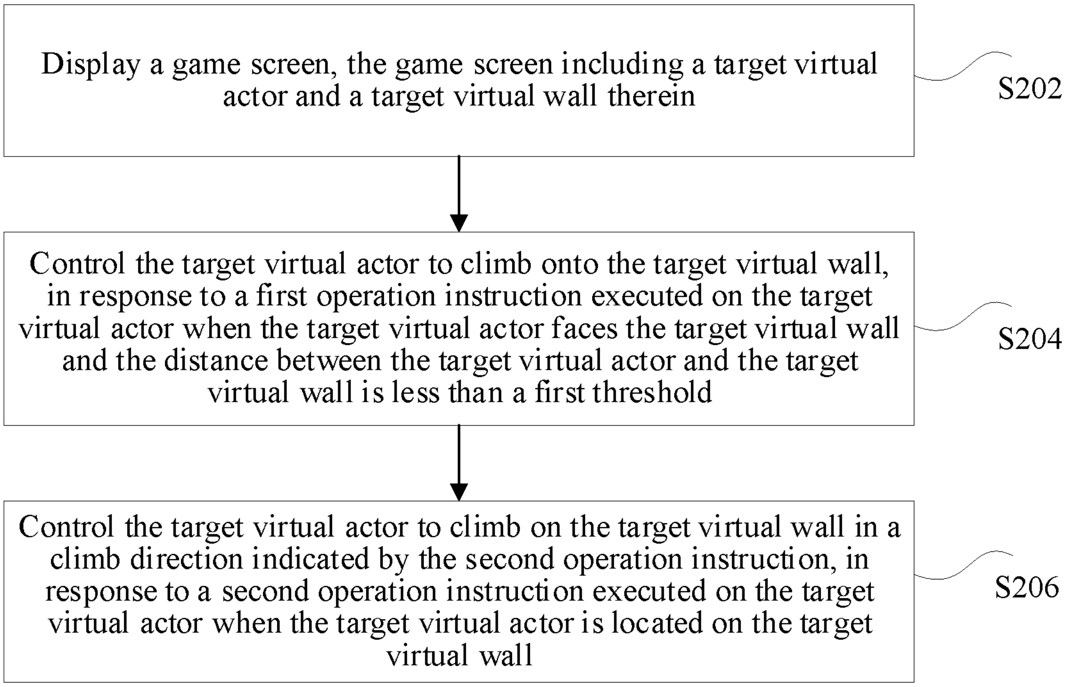
FIG. 2 is a schematic flowchart of a controlling method of a virtual actor according to an embodiment of the present disclosure.

As an implementation, as shown in FIG. 2, the above-mentioned controlling method of the virtual actor includes steps S202 to S204:

S202: Display a game screen, the game screen including a target virtual actor and a target virtual wall;

S204: Control the target virtual actor to climb onto the target virtual wall, in response to a first operation instruction executed on the target virtual actor when the target virtual actor faces the target virtual wall, and the distance between the target virtual actor and the target virtual wall is less than a first threshold; and

S206: Control the target virtual actor to climb on the target virtual wall in a climb direction indicated by the second operation instruction, in response to a second operation instruction executed on the target virtual actor when the target virtual actor is located on the target virtual wall.

In this embodiment, application scenarios of the above-mentioned controlling method of the virtual actor may include, but are not limited to, game applications in various application scenarios such as medical, finance, credit checking, banking, energy, education, buildings, games, transportation, Internet of Things and industry.

In this embodiment, the game application may be a multiplayer online battle arena (MOBA) application or may be a single-player game (SPG) application. The types of the above-mentioned game applications may include, but are not limited to, at least one of: a two-dimension (2D) game application, a three-dimension (3D) game application, a virtual reality (VR) game application, an augmented reality (AR) game application and a mixed reality (MR) game application. The above is only an example, which will not be limited in this embodiment.

Furthermore, the above-mentioned game applications may include, but are not limited to, a third person shooting game (TPS) application, for example, the shooting game application is run from the perspective of a third party actor object other than the virtual actor controlled by the current player, or may be a first person shooting game (FPS) application, for example, the shooting game application is run from the perspective of the virtual actor controlled by the current player.

In this embodiment, the above-mentioned target virtual actor may include, but is not limited to, virtual actors, virtual animals, virtual animation actors, virtual vehicles, etc. The above-mentioned target virtual wall may include, but is not limited to, virtual obstacles displayed in the game screen. The above-mentioned first threshold may include, but is not limited to, being pre-configured by a planner, but can also be determined by the angle and distance between the target virtual actor and the target virtual wall.

Figure 3:
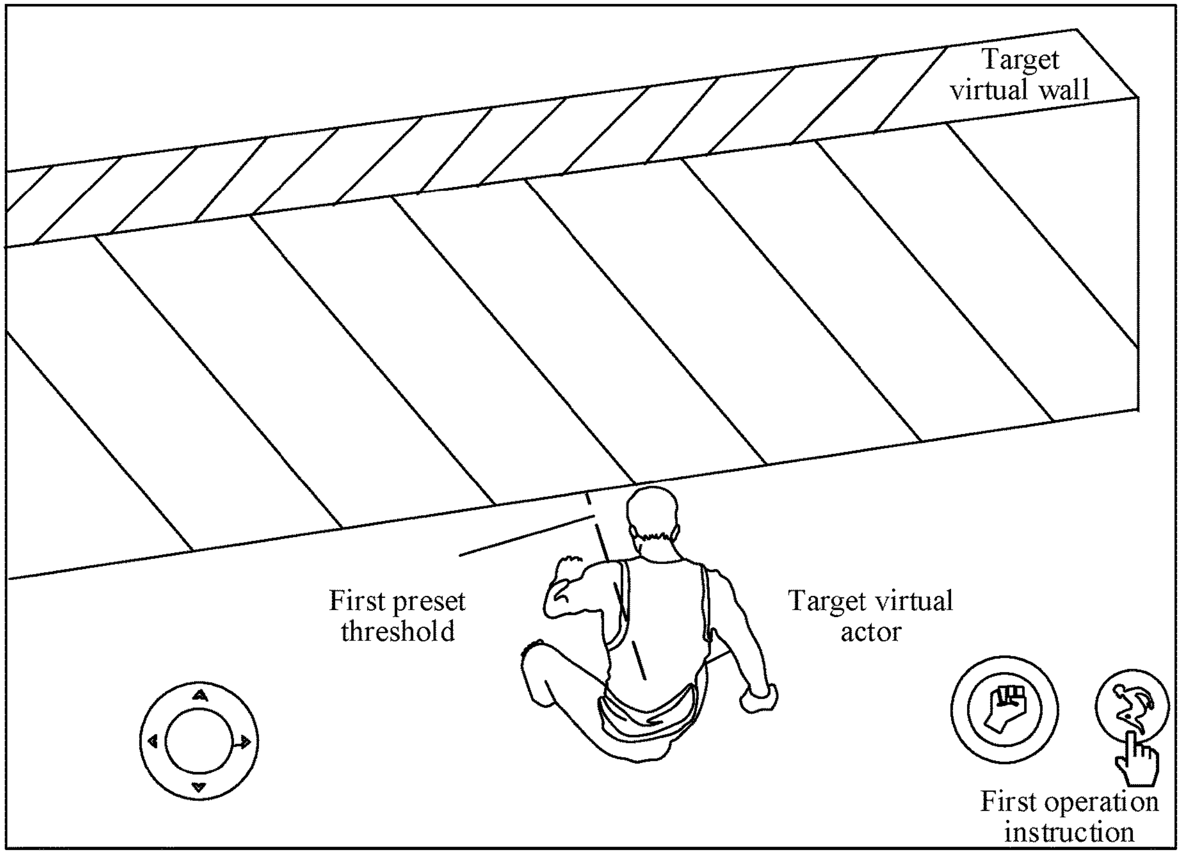
FIG. 3 is a schematic diagram of a controlling method of a virtual actor according to an embodiment of the present disclosure.

For example, FIG. 3 is a schematic diagram of a controlling method of a virtual actor according to an embodiment of the present disclosure. As shown in FIG. 3, the game screen includes a target virtual actor and a target virtual wall.

The distance between the target virtual actor and the target virtual wall is acquired, and the target virtual actor is controlled in response to the first operation instruction shown in FIG. 3 to climb onto the target virtual wall, when the above-mentioned distance is less than the first threshold.

Figure 4:
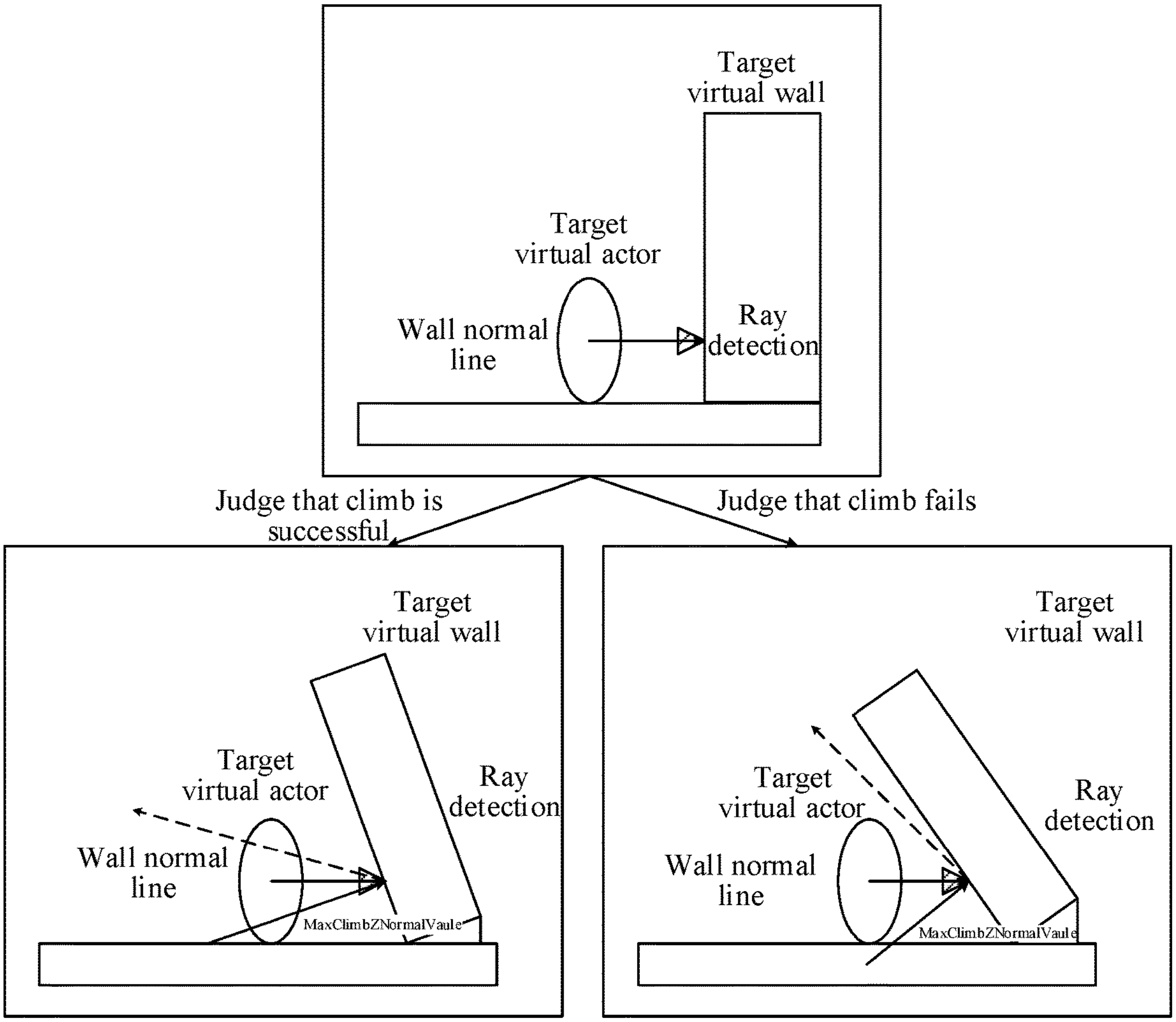
FIG. 4 is a schematic diagram of another controlling method of a virtual actor according to an embodiment of the present disclosure.

FIG. 4 is a schematic diagram of another controlling method of a virtual actor according to an embodiment of the present disclosure. As shown in FIG. 4, the above-mentioned determining whether to control the target virtual actor to climb onto the target virtual wall by the angle and distance between the target virtual actor and the target virtual wall may include, but is not limited to, the following contents:

detecting, with a ray, the target virtual wall from the target virtual actor; acquire the angle between the ray and the target virtual wall; determining whether the target virtual actor is allowed to climb to the target virtual wall by comparing the magnitude of this angle with the angle between the ray and a wall normal line; acquiring the distance between the target virtual actor and the target virtual wall when it is determined that the target virtual actor is allowed to climb to the target virtual wall; and controlling, in response to the first operation instruction, the target virtual actor to climb onto the target virtual wall, when the above-mentioned distance is less than the first threshold.

In other words, the target virtual actor can be controlled to climb to the target virtual wall by the following ways including, but not limited to:

Currently, if components (such as building components or collision components) or actors in a scenario detected with the ray are not labeled with a tag of NoClimb, these components or actors can both enter climb. It is to be understood that the above-mentioned target virtual wall is a virtual wall that allows climb. A slope of the target virtual wall (e.g., the Z value of the normal vector of the virtual wall) is less than a maximum climb slope parameter (MaxClimbZNormalVaule) to avoid that the virtual wall is excessively tilted. The angle between the horizontal direction of the target virtual actor and the horizontal direction of the normal vector of the virtual wall is less than MaxFacingWallAngle, or less than AutoClimbMaxFacingWallAngle during automatic climb, that is, it is guaranteed that the target virtual actor faces the target virtual wall.

When the Z value of the normal vector of the virtual wall is greater than the MaxClimbZNormalVaule, it is determined that the above-mentioned target virtual actor cannot be controlled to climb onto the target virtual wall.

The above is only an example, to which any specific limitation will not be made in this embodiment.

Of course, other conditions can be further included, but are not limited to, for determining whether the target virtual actor is allowed to climb to the target virtual wall. For example, if the total climb distance is less than ClimbLimitHeight, and Z-axis direction speed is less than ClimbEndSpeed, and is not within the cool-down time of the first operation instruction, the target virtual actor is allowed to climb to the target virtual wall, where the cool-down time is a judgment time range that is set according to the actual needs, and only one-time judgment is allowed within this judgment time range. When the total climb distance is greater than or equal to the ClimbLimitHeight, it is not allowed to control the target virtual actor to climb. Furthermore, detecting no obstacle can also be used for determining that the target virtual actor is allowed to climb to the target virtual wall, for example, other objects cannot be detected during capsule detection in front of a target virtual object, and the like.

In this embodiment, the above-mentioned second operation instruction can be configured to be the same or different from the first operation instruction. The above-mentioned second operation instruction is used for controlling the target virtual actor to climb on the target virtual wall in the climb direction indicated by the second operation instruction.

Figure 5:
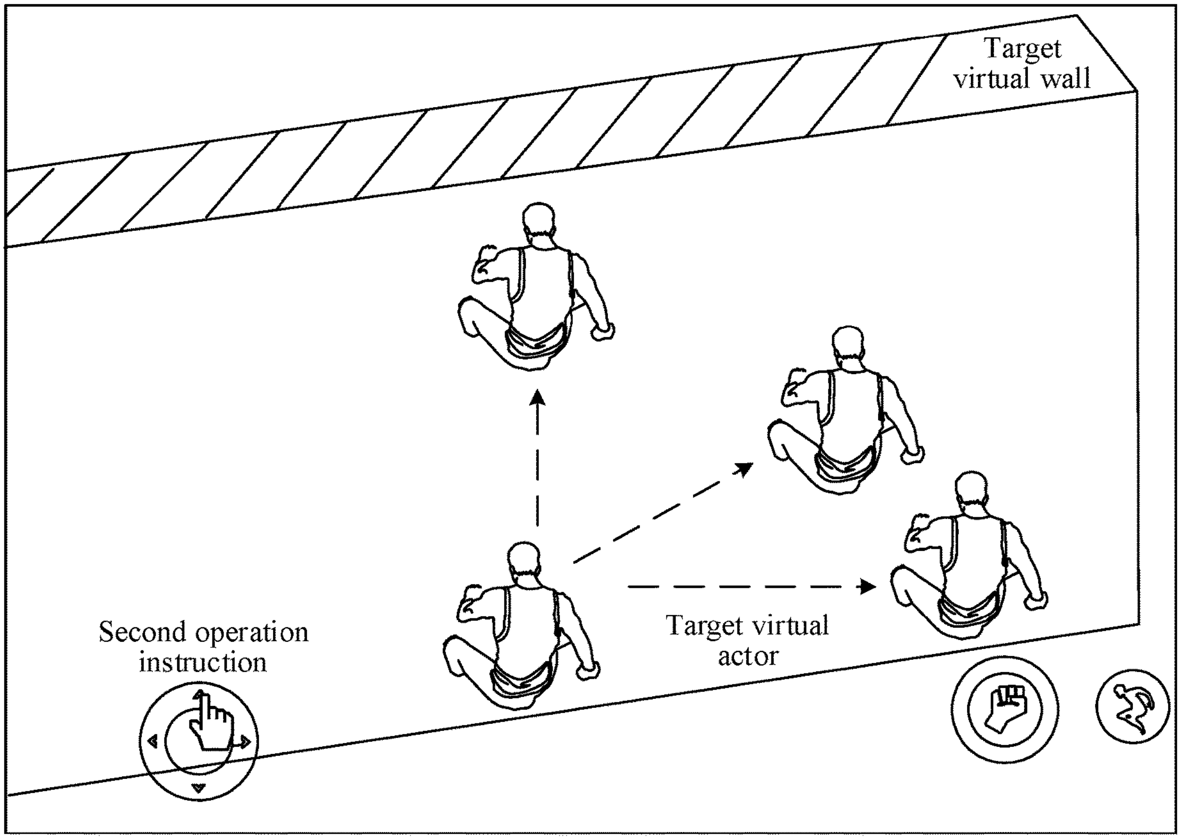
FIG. 5 is a schematic diagram of another controlling method of a virtual actor according to an embodiment of the present disclosure.

For example, FIG. 5 is a schematic diagram of another controlling method of a virtual actor according to an embodiment of the present disclosure. As shown in FIG. 5, the game screen includes a target virtual actor and a target virtual wall.

The second operation instruction is acquired, and the target virtual actor is controlled in response to the second operation instruction to climb on the target virtual wall in the climb direction indicated by the second operation instruction, as shown in FIG. 5.

The above is only an example, to which any specific limitation will not be made in this embodiment.

In this embodiment of the present disclosure, by executing corresponding operation instructions under certain conditions, the virtual actor can be controlled to climb onto the virtual wall, so as to avoid that the virtual actor can climb to a position with a preset height only by, for example, the operation mode of taking the stairs or jumping for multiple times when encountering the virtual wall, which solves the technical problem that the control efficiency of the virtual actor in the related art is low.

As an implementation, control in the target game application, in response to the first operation instruction executed on the target virtual actor, the target virtual actor to climb onto the target virtual wall includes:

- controlling, in the target game application, in response to a jump operation instruction executed on the target virtual actor, the target virtual actor to climb onto the target virtual wall, where the first operation instruction includes the jump operation instruction, the jump operation instruction being used for instructing the target virtual actor to perform a first jump action; or
- controlling in the target game application, in response to a first move operation instruction executed on the target virtual actor, the target virtual actor to climb onto the target virtual wall, where the first operation instruction includes the first move operation instruction, the first move operation instruction being used for instructing the target virtual actor to move towards the target virtual wall; and or
- controlling, in the target game application, in response to the jump operation instruction and the first move operation instruction executed simultaneously on the target virtual actor, the target virtual actor to climb onto the target virtual wall, where the first operation instruction includes the jump operation instruction and the first move operation instruction, the jump operation instruction and the first move operation instruction being used for instructing the target virtual actor to perform the first jump action in the direction of the target virtual wall.

In this embodiment, the above-mentioned jump operation instruction and first move operation instruction may include, but are not limited to, a touch operation instruction. For example, corresponding virtual buttons are configured in advance, and touch operations on the virtual buttons are acquired to acquire the above-mentioned jump operation instruction and the first move operation instruction.

In this embodiment, the above-mentioned jump operation instruction and first move operation instruction may include, but are not limited to, a voice operation instruction. For example, voice information is collected by a voice acquiring device, and semantics in the voice information are recognized to acquire the above-mentioned jump operation instruction and the first move operation instruction.

Figure 6:
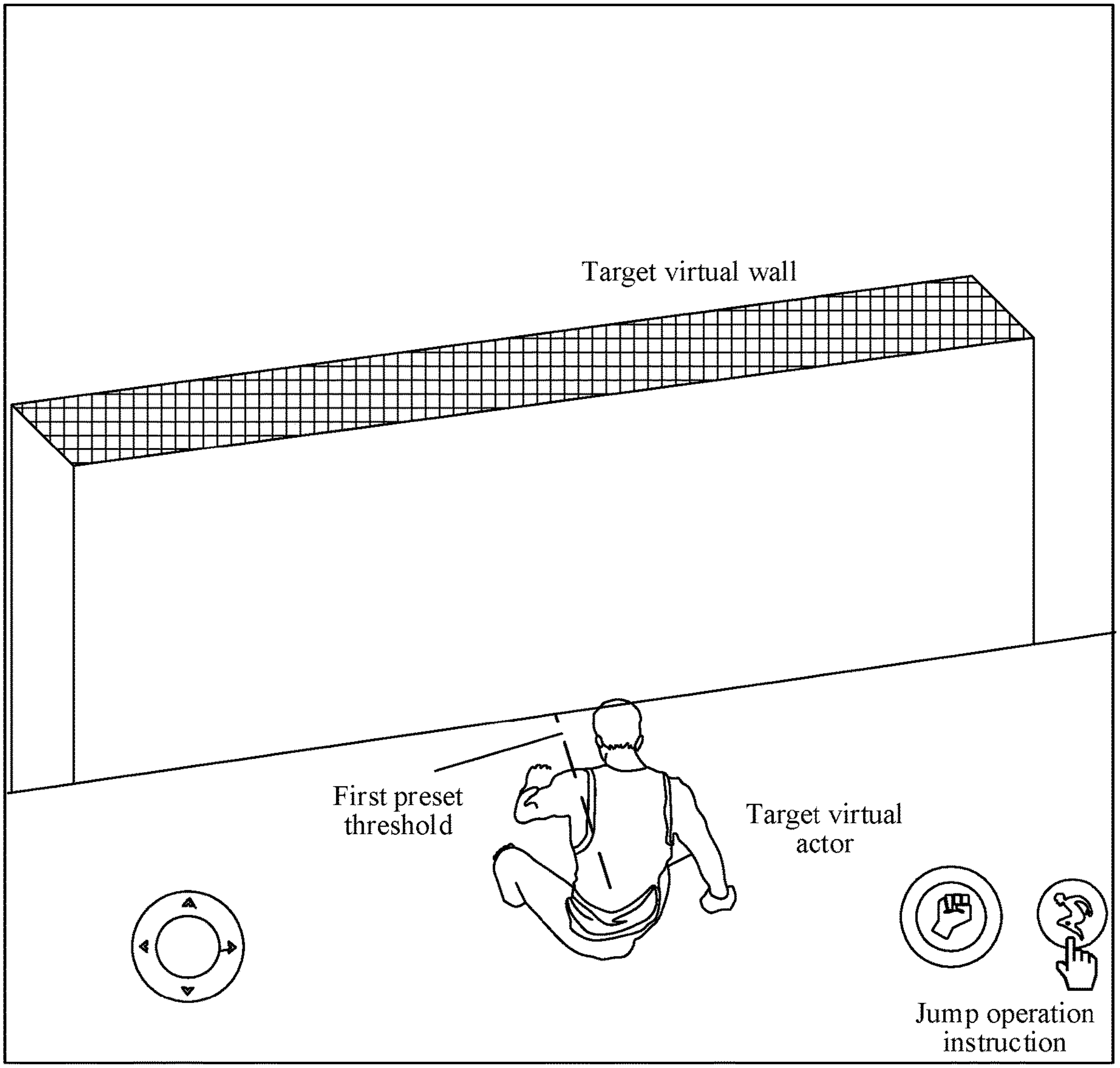
FIG. 6 is a schematic diagram of another controlling method of a virtual actor according to an embodiment of the present disclosure.

For example, FIG. 6 is a schematic diagram of another controlling method of a virtual actor according to an embodiment of the present disclosure. As shown in FIG. 6, the game screen includes a target virtual actor and a target virtual wall.

The jump operation instruction is acquired, and the target virtual actor is controlled in the target game application, to climb onto the target virtual wall, as shown in FIG. 6.

In this embodiment of the present disclosure, when the climb height of the virtual actor is greater than a threshold, the virtual actor is controlled to perform a corresponding jump action (for example, little jump). After performing the jump action, the virtual actor stands on the top of the virtual wall or jumps off the virtual wall. In the above-mentioned way, it can be avoided that the virtual actor moves by climbing the virtual wall to a position or region where the virtual actor is not allowed to move, thereby reducing the possibility of problems with the game applications.

Figure 7:
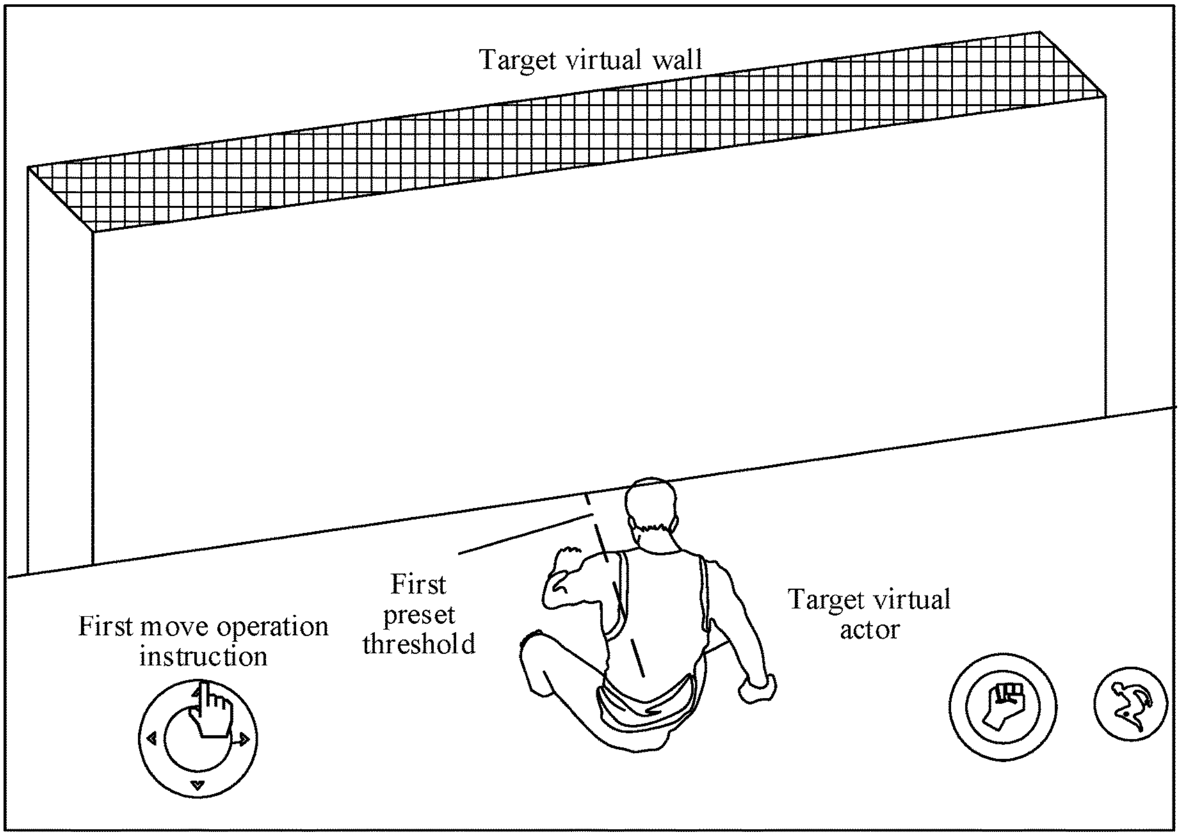
FIG. 7 is a schematic diagram of another controlling method of a virtual actor according to an embodiment of the present disclosure.

For example, FIG. 7 is a schematic diagram of another controlling method of a virtual actor according to an embodiment of the present disclosure. As shown in FIG. 7, the game screen includes a target virtual actor and a target virtual wall.

The first move operation instruction is acquired, and the target virtual actor is controlled in the target game application to climb onto the target virtual wall, as shown in FIG. 7.

As an implementation, the method further includes:

- displaying, in the target game application, a climb state identifier when the target virtual actor faces the target virtual wall, and the distance between the target virtual actor and the target virtual wall is less than the first threshold, where the climb state identifier indicates that the target virtual actor is in a state of being allowed to climb the target virtual wall.

In this embodiment, the above-mentioned climb state identifier may include, but is not limited to, flexible configuration according to modeling of the target virtual actor, for example, taking part of the image of the target virtual actor as the climb state identifier, and may further include, but is not limited to, taking part of the image of the target virtual wall as the above-mentioned climb state identifier.

Figure 8:
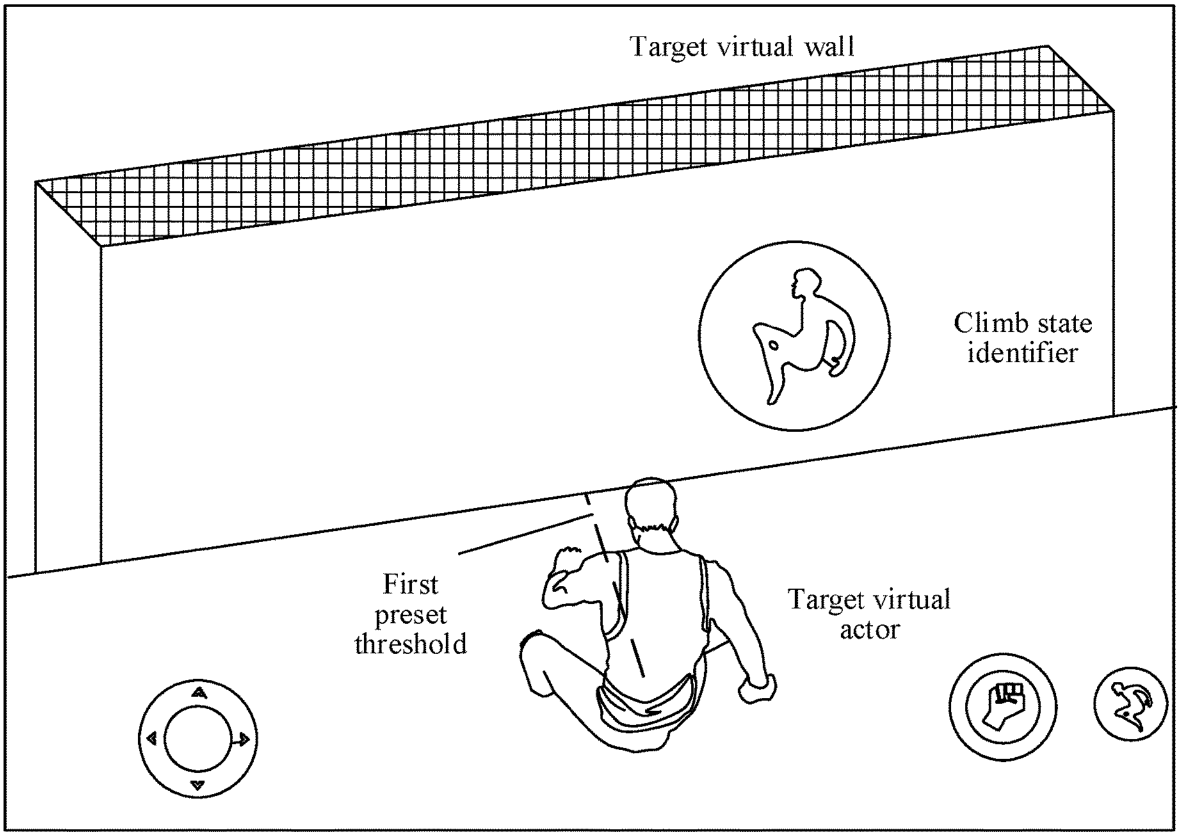
FIG. 8 is a schematic diagram of another controlling method of a virtual actor according to an embodiment of the present disclosure.

For example, FIG. 8 is a schematic diagram of another controlling method of a virtual actor according to an embodiment of the present disclosure. As shown in FIG. 8, the game screen includes a target virtual actor and a target virtual wall.

The climb state identifier is displayed in the target game application when the target virtual actor faces the target virtual wall, and the distance between the target virtual actor and the target virtual wall is less than the first threshold.

In this embodiment of the present disclosure, when the conditions for climbing the wall are met, it can be prompted that the virtual actor is in the state of being allowed to climb the virtual wall, by displaying in the game application the climb state identifier. As such, it can be avoided that an incorrect climb move is performed on the virtual actor when the virtual actor is not in a climb state due to an inaccurate judgment of the climb state, or, the virtual actor is in the climb state for a period of time before realizing that the virtual actor can be controlled to climb the virtual wall due to the fact that the judgment of the climb state is not timely.

As an implementation, the controlling, in the target game application, in response to the second operation instruction executed on the target virtual actor, the target virtual actor to climb on the target virtual wall in the direction indicated by the second operation instruction includes:

- controlling, in the target game application, in response to a second move operation instruction executed on the target virtual actor, the target virtual actor to climb on the target virtual wall in a climb direction indicated by the second move operation instruction, where the second move operation instruction includes the second move operation instruction.

In this embodiment, the above-mentioned second operation instruction includes the second move operation instruction, which may include, but is not limited to, a lateral-move operation instruction, a diagonal upward-move operation instruction and an upward-move operation instruction.

In this embodiment, the above-mentioned climb speed of climbing in the climb direction indicated by the second move operation instruction can be flexibly adjusted according to an actual service scenario.

For example, the climb speed may include, but is not limited to, the following formulas:

1) if the character is controlled to climb up, climb acceleration is obtained from a Z-axis direction, the calculation formula is AccDirZ=(Climb Acceleration*Delta Time), where Delta Time represents climb duration;
2) if there is gravity and constant attenuation (ClimbDeceleration) for Z-axis acceleration, the calculation formula is AccDirZ=((ClimbDeceleration+980.0f)*DeltaTime);
3) if there is horizontal speed, but the character is not controlled to move horizontally, ClimbHorizontalDeceleration is applied until it attenuates to 0:

```
CurVelocityHorizontalSpeed=
  (ClimbHorizontalDeceleration*DeltaTime);
  if (CurVelocityHorizontalSpeed<0)
    {
      CurVelocityHorizontalSpeed=0;
    }
```

4) if there is the horizontal speed and the character is controlled to move horizontally, player's horizontal acceleration is added to the horizontal speed:

```
CurVelocityHorizontalSpeed+=
  (CurAccelerationHorizontalSpeed*DeltaTime);
```

5) if there is no horizontal speed, but the target virtual actor starts to move horizontally, ClimbHorizontalSpeed is obtained:

```
CurVelocityHorizontalSpeed=ClimbHorizontalSpeed;
```

and 6) a final speed vector is calculated, the horizontal acceleration and the Z-axis direction acceleration are calculated according to the horizontal speed and the player's horizontal acceleration, and final Z-axis direction speed is calculated:

```
AccDir.Z=0;
AccDir.Normalize( );
CurAccelerationHorizontalVelocity=CurVelocity
  HorizontalSpeed*AccDir;
Velocity.X=CurAccelerationHorizontalVelocity.X;
Velocity.Y=CurAccelerationHorizontalVelocity.Y;
Velocity.Z+=AccDirZ.
```

The above is only an example, to which any specific limitation will not be made in this embodiment.

In this embodiment of the present disclosure, by executing corresponding operation instructions under certain conditions, the virtual actor can be controlled to climb onto the virtual wall, so as to avoid that the virtual actor can climb to a position with a preset height only by, for example, the operation mode of taking the stairs or jumping for multiple times when encountering the virtual wall, which solves the technical problem that the control efficiency of the virtual actor in the related art is low.

As an implementation, controlling, in the target game application, in response to the second move operation instruction executed on the target virtual actor, the target virtual actor to climb on the target virtual wall in the direction indicated by the second move operation instruction includes:

controlling in the target game application, in response to the lateral-move operation instruction executed on the target virtual actor, the target virtual actor to climb on the target virtual wall in a lateral direction indicated by the lateral-move operation instruction, where the second move operation instruction includes the lateral-move operation instruction, and when the target virtual actor climbs in the lateral direction indicated by the lateral-move operation instruction, the height of the target virtual actor from virtual ground remains unchanged, the virtual ground being contacted with the bottom of the target virtual wall; or controlling, in the target game application, in response to the diagonal upward-move operation instruction executed on the target virtual actor, the target virtual actor to climb on the target virtual wall in a diagonal upward direction indicated by the diagonal upward-move operation instruction, where the second move operation instruction includes the diagonal upward-move operation instruction, and when the target virtual actor climbs in the diagonal upward direction indicated by the diagonal upward-move operation instruction, the height of the target virtual actor from the virtual ground becomes larger; or controlling in the target game application, in response to the upward-move operation instruction executed on the target virtual actor, the target virtual actor to climb on the target virtual wall in an upward direction indicated by the upward-move operation instruction, where the second move operation instruction includes the upward-move operation instruction, and when the target virtual actor climbs in the upward direction indicated by the upward-move operation instruction, the height of the target virtual actor from the virtual ground becomes larger.

In this embodiment, the above-mentioned lateral-move operation instruction, diagonal upward-move operation instruction and upward-move operation instruction may include, but are not limited to, the touch operation instruction. For example, the corresponding virtual buttons are configured in advance to obtain the touch operation of the virtual button, and the touch operations on the virtual buttons are acquired to acquire the above-mentioned lateral-move operation instruction, diagonal upward-move operation instruction and upward-move operation instruction.

In this embodiment, the above-mentioned lateral-move operation instruction, diagonal upward-move operation instruction and upward-move operation instruction may include, but are not limited to, the voice operation instruction. For example, the voice information is collected by the voice acquiring device, and the semantics in the voice information are recognized to acquire the above-mentioned lateral-move operation instruction, diagonal upward-move operation instruction and upward-move operation instruction.

In this embodiment, when the above-mentioned target virtual actor moves laterally, the height of the target virtual actor from the virtual ground remains unchanged. When the above-mentioned target virtual actor moves diagonally upwards or upwards, the height of the target virtual actor from the virtual ground becomes larger.

Figure 9:
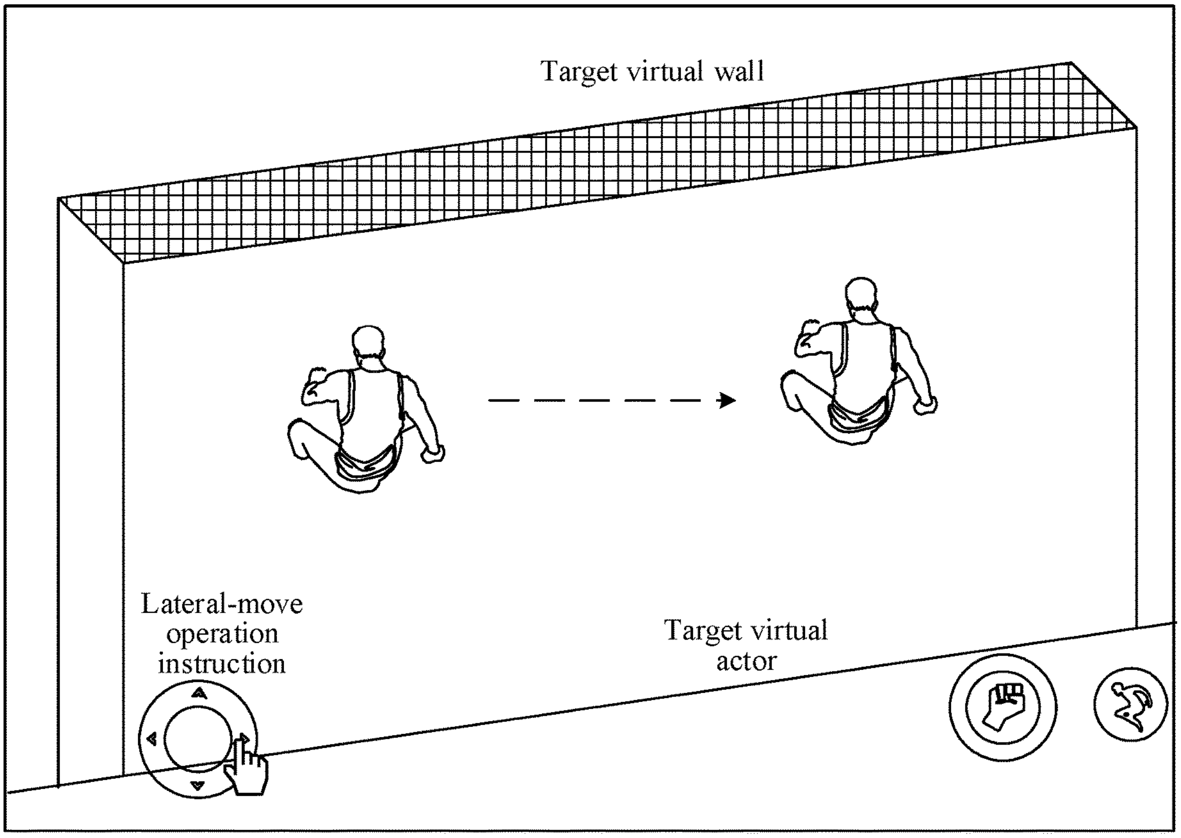
FIG. 9 is a schematic diagram of another controlling method of a virtual actor according to an embodiment of the present disclosure.

For example, FIG. 9 is a schematic diagram of another controlling method of a virtual actor according to an embodiment of the present disclosure. As shown in FIG. 9, the game screen includes a target virtual actor and a target virtual wall.

T the lateral-move operation instruction is acquired, and the target virtual actor is controlled to climb on the target virtual wall in the lateral-move direction indicated by the lateral-move operation instruction.

Figure 10:
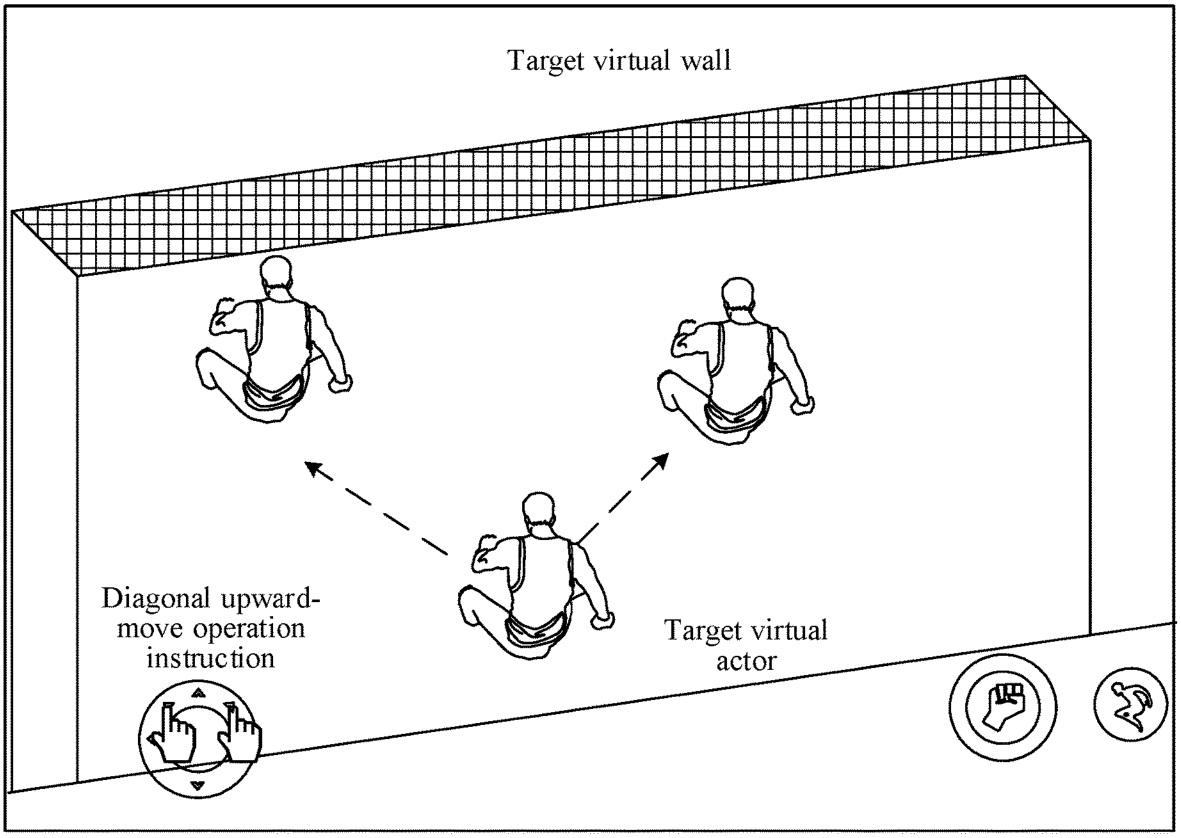
FIG. 10 is a schematic diagram of another controlling method of a virtual actor according to an embodiment of the present disclosure.

For another example, FIG. 10 is a schematic diagram of another controlling method of a virtual actor according to an embodiment of the present disclosure. As shown in FIG. 10, the game screen includes a target virtual actor and a target virtual wall.

The diagonal upward-move operation instruction is acquired, and the target virtual actor is controlled to climb on the target virtual wall in the diagonal upward direction indicated by the diagonal upward-move operation instruction.

Figure 11:
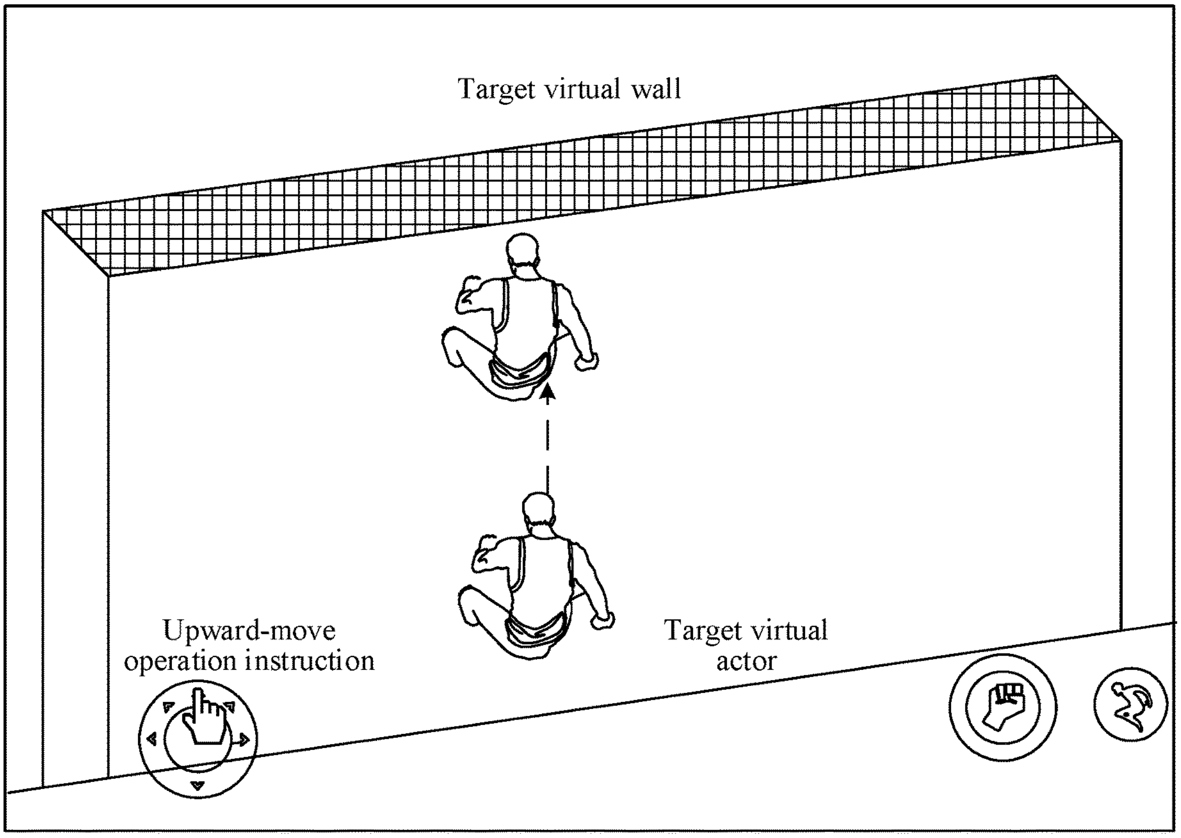
FIG. 11 is a schematic diagram of another controlling method of a virtual actor according to an embodiment of the present disclosure.

For another example, FIG. 11 is a schematic diagram of another controlling method of a virtual actor according to an embodiment of the present disclosure. As shown in FIG. 11, the game screen includes a target virtual actor and a target virtual wall.

The upward-move operation instruction is acquired, and the target virtual actor is climbed to climb on the target virtual wall in the upward direction indicated by the upward-move operation instruction.

The above is only an example, to which any specific limitation will not be made in this embodiment.

As an implementation, the method further includes:

acquiring the climb stop duration of the target virtual actor when the target virtual actor is located on the target virtual wall, where the climb stop duration is the duration of the target virtual actor stops on the target virtual wall (e.g., from the end moment of last climb of the target virtual actor to current moment); and controlling, in the target game application, the target virtual actor to fall off the target virtual wall, when the climb stop duration reaches a second threshold.

In this embodiment, the above-mentioned climb stop duration can be pre-configured directly by the planner. The duration from the time when the climb speed of the above-mentioned target virtual actor is 0 to the current moment is determined as the climb stop duration. It may be further included, but is not limited to, configuring a virtual resource for the target virtual actor to climb. During the climb process of the target virtual actor, the above-mentioned virtual resources will continue to be consumed. When the above-mentioned virtual resource is totally consumed or the consumption reaches a certain threshold, the above-mentioned climb stop duration is determined as corresponding climb duration when the consumption of the virtual resource reaches a preset threshold.

Figure 12:
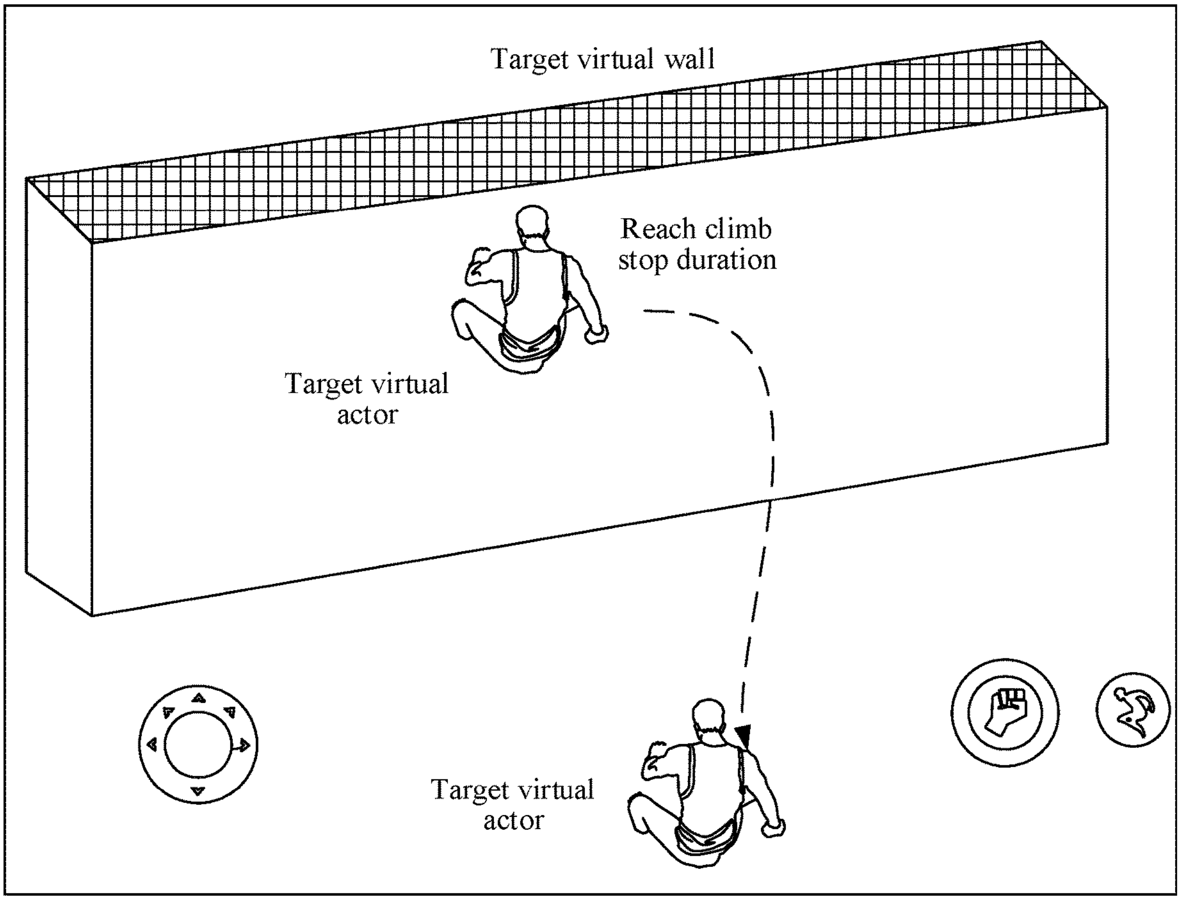
FIG. 12 is a schematic diagram of another controlling method of a virtual actor according to an embodiment of the present disclosure.

For example, FIG. 12 is a schematic diagram of another controlling method of a virtual actor according to an embodiment of the present disclosure. As shown in FIG. 12, the game screen includes a target virtual actor and a target virtual wall.

The climb stop duration of the target virtual actor is acquired when the target virtual actor is located on the target virtual wall, and the target virtual actor is controlled in the target game application to fall off the target virtual wall, when the climb stop duration reaches the second threshold.

The above is only an example, to which any specific limitation will not be made in this embodiment.

In this embodiment of the present disclosure, it can be avoided by setting the climb stop duration that the target virtual actor stays on the target virtual wall for a long time, such that the climb effect is more realistic.

As an implementation, the method further includes:

controlling, in the target game application, in response to a diagonal downward-move operation instruction executed on the target virtual actor, the target virtual actor to fall off the target virtual wall, when the target virtual actor is located on the target virtual wall, where a move direction indicated by the diagonal downward-move operation instruction is a diagonal downward direction; or controlling, in the target game application, in response to a downward-move operation instruction executed on the target virtual actor, the target virtual actor to fall off the target virtual wall, when the target virtual actor is located on the target virtual wall, where a move direction indicated by the downward-move operation instruction is a downward direction; or controlling, in the target game application, in response to the jump operation instruction executed on the target virtual actor, the target virtual actor to fall off the target virtual wall, when the target virtual actor is located on the target virtual wall.

In this embodiment, the above-mentioned jump operation instruction, diagonal downward-move operation instruction and downward-move operation instruction may include, but are not limited to, the touch operation instruction. For example, the corresponding virtual buttons are configured in advance, and the touch operations on the virtual buttons are acquired to acquire the above-mentioned jump operation instruction, diagonal downward-move operation instruction and downward-move operation instruction.

In this embodiment, the above-mentioned jump operation instruction, diagonal downward-move operation instruction and downward-move operation instruction may include, but are not limited to, the voice operation instruction. For example, the voice information is collected by the voice acquiring device, and the semantics in the voice information are recognized to acquire the above-mentioned jump operation instruction, diagonal downward-move operation instruction and downward-move operation instruction.

Figure 13:
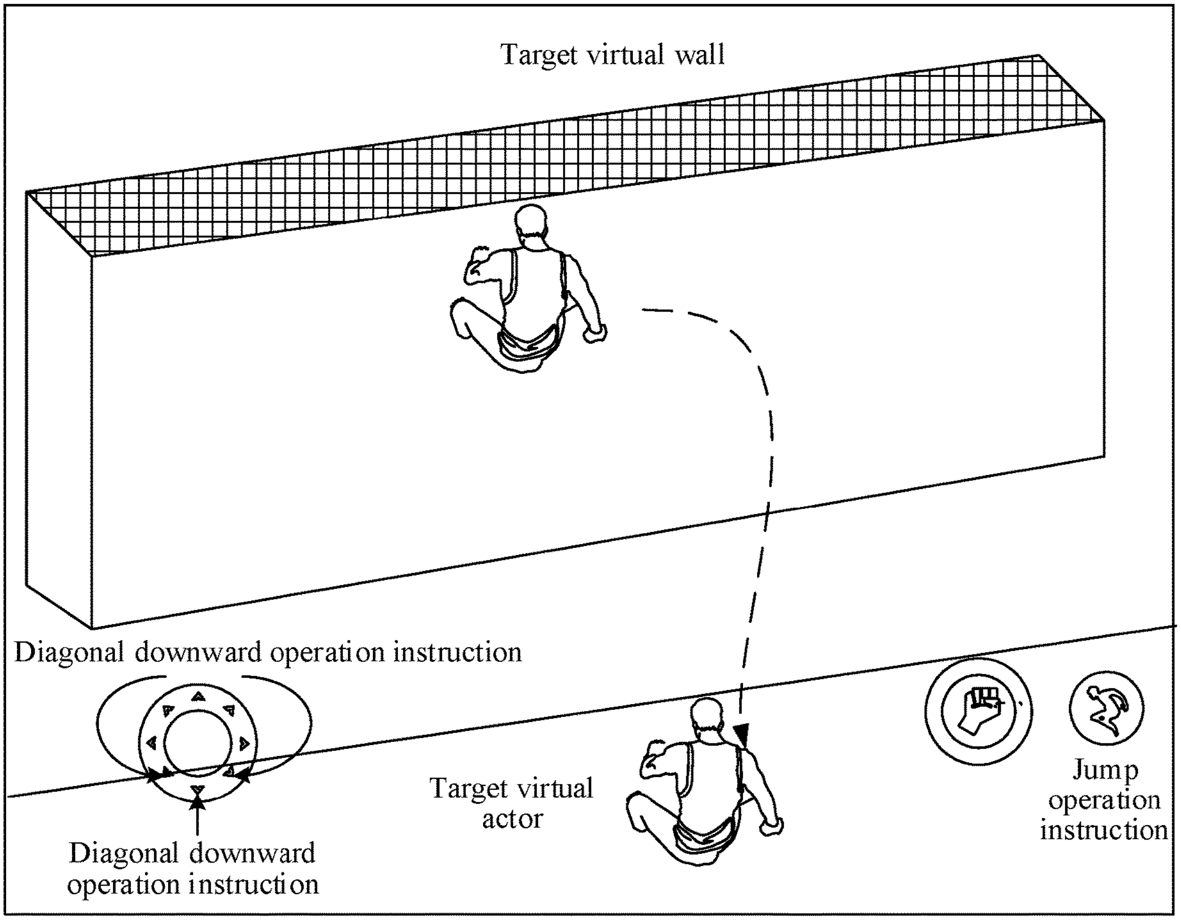
FIG. 13 is a schematic diagram of another controlling method of a virtual actor according to an embodiment of the present disclosure.

For example, FIG. 13 is a schematic diagram of another controlling method of a virtual actor according to an embodiment of the present disclosure. As shown in FIG. 13, the game screen includes a target virtual actor and a target virtual wall.

The target virtual actor is controlled in the target game application, in response to the downward-move operation instruction, the diagonal downward-move operation instruction and the jump operation instruction executed on the target virtual actor, to fall off the target virtual wall, when the target virtual actor is located on the target virtual wall.

As an implementation, the method further includes:

acquiring the climb height of the target virtual actor on the target virtual wall when the target virtual actor is located on the target virtual wall;

controlling, in the target game application, in response to the upward-move operation instruction or diagonal upward-move operation instruction executed on the target virtual actor, the target virtual actor to perform a second jump action upwards, when the climb height reaches a third threshold;

displaying, in the target game application, the target virtual actor standing on the top of the target virtual wall, when the target virtual actor reaches the top of the target virtual wall after performing the second jump action upwards; and controlling, in the target game application, the target virtual actor to fall off the target virtual wall, when the target virtual actor does not reach the top of the target virtual wall after performing the second jump action upwards.

In this embodiment, the above-mentioned climb height may include, but is not limited to, the height from the center of the target virtual actor to the virtual ground. The above-mentioned second jump action may include, but is not limited to, "little jump", "cross over" and other actions. The above-mentioned climb height reaching the third threshold may include, but is not limited to, a difference value between the above-mentioned target virtual actor and the top of the above-mentioned target virtual wall reaching the above-mentioned third threshold, and may further include, but is not limited to, the height of the above-mentioned target virtual actor from the virtual ground reaching the above-mentioned third threshold.

Figure 14:
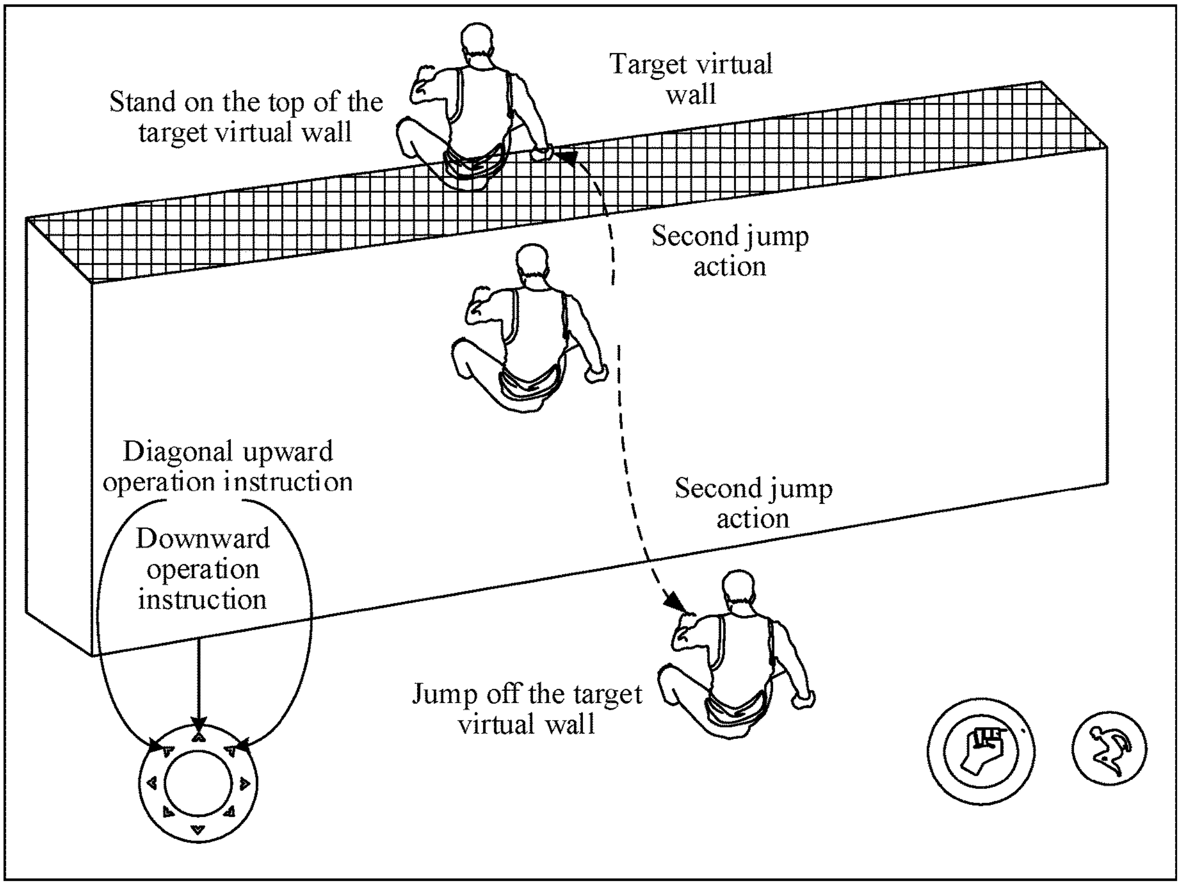
FIG. 14 is a schematic diagram of another controlling method of a virtual actor according to an embodiment of the present disclosure.

For example, FIG. 14 is a schematic diagram of another controlling method of a virtual actor according to an embodiment of the present disclosure. As shown in FIG. 14, the game screen includes a target virtual actor and a target virtual wall.

The climb height of the target virtual actor on the target virtual wall is acquired when the target virtual actor is located on the target virtual wall;

The target virtual actor is controlled in the target game application, in response to the upward-move operation instruction or diagonal upward-move operation instruction executed on the target virtual actor, to perform the second jump action upwards, when the climb height reaches the third threshold;

The target virtual actor standing on the top of the target virtual wall is displayed in the target game application when the target virtual actor reaches the top of the target virtual wall after performing the second jump action upwards; and The target virtual actor is controlled in the target game application to fall off the target virtual wall, when the target virtual actor does not reach the top of the target virtual wall after performing the second jump action upwards.

Figure 15:
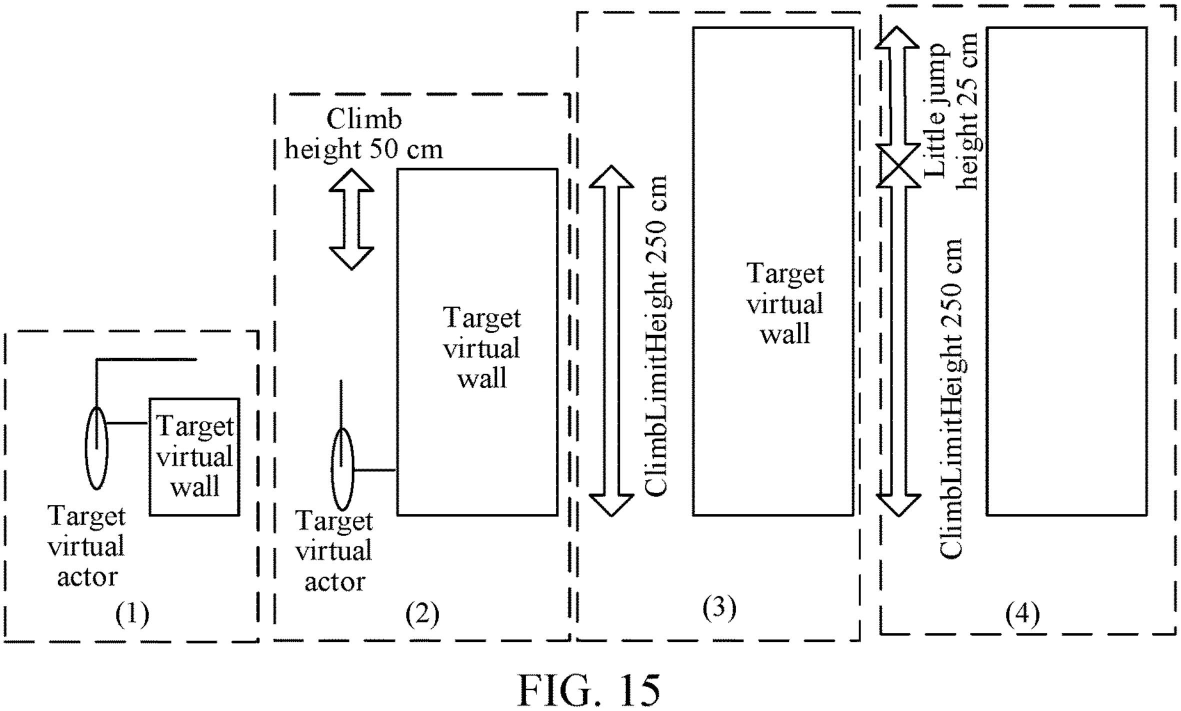
FIG. 15 is a schematic diagram of another controlling method of a virtual actor according to an embodiment of the present disclosure.

In this embodiment, it may be understood that the above-mentioned target virtual actor reaches a hang point, when the climb height reaches the third threshold. FIG. 15 is a schematic diagram of another controlling method of a virtual actor according to an embodiment of the present disclosure. As shown in FIG. 15, it may be included, but is not limited to, determining a subsequent behavior of the target virtual actor according to the climb height as shown in Table 1, where a climb ending action is judged according to the height of the target virtual wall: (Falling point height difference value: the height difference value between the hang point and the current position of the target virtual actor), (height difference: the height difference between the current position of the target virtual actor and the top of the target virtual wall):

TABLE 1

| | Relationship | Range | Action | Cycle |
|---|---|---|---|---|
| Height difference and falling point height difference value (1) | < | −10 | No push-down action | |
| Height difference and falling point height difference value (2) | | 10 | little jump action, and no push-down action | Random |
| Height difference and falling point height difference value (3) | < | 30 | Little jump and push-down action, and no little jump but with push-down action | Random |
| Height difference and falling point height difference value (4) | < | ClimbLimitHeight | Little jump and push-down action | |

As an implementation, the method further includes:

acquiring the fall-to-the-ground duration of the target virtual actor after the target virtual actor falls to the virtual ground, after control in the target game application, the target virtual actor to fall off the target virtual wall;

setting the target virtual actor to be forbidden from climbing onto the target virtual wall until a climbing cooldown period is over (e.g., the target virtual actor may be forbidden from climbing when the fall-to-the-ground duration does not reach a fourth threshold; and may be allowed to climb onto the target virtual wall, when the fall-to-the-ground duration reaches a fourth threshold).

In this embodiment, after the above-mentioned fall off the target virtual wall, it may be included, but is not limited to, configuring climb cool-down time for the target virtual actor. When the climbing cooldown period is not over (e.g., the fall-to-the-ground duration does not reach the fourth threshold, the target virtual actor is forbidden from climbing. When the climbing cooldown period is over (e.g., the fall-to-the-ground duration reaches the fourth threshold), the target virtual actor is allowed to climb.

Specifically, in order to prevent the target virtual actor from easily entering the climb state or indicate that a climb is ended, if the target virtual actor is currently able to enter the climb state and has fallen to the ground since last climb, it is considered that the above-mentioned target virtual actor is forbidden from climbing again.

As an implementation, the method further includes:

detecting whether the target virtual actor collides with the target virtual wall, during the process of target virtual actor falling (e.g., parachuting); and controlling, in the target game application, the target virtual actor to catch at a collision location (e.g., climb onto) the target virtual wall, when it is detected that the target virtual actor collides with the target virtual wall.

In this embodiment, the above-mentioned target virtual actor falling may include, but is not limited to, a parachuting behavior from a virtual flying vehicle, or a falling behavior directly from the air.

In this embodiment, the above-mentioned control the target virtual actor to climb onto the target virtual wall when the target virtual actor collides with the target virtual wall may include, but is not limited to, performing capsule detection on the target virtual actor and the target virtual wall, and detection distance may include, but is not limited to, the above-mentioned first threshold.

In this embodiment of the present disclosure, in a case of virtual actor falling, the virtual actor can be directly controlled to climb on the virtual wall through the collision between the virtual actor and the virtual wall, and thus, a scene of virtual actor climbing the virtual wall is added, and the operation of virtual actor climbing to the position with the preset height on the virtual wall can also be omitted (for example, it is not necessary to control the virtual actor to climb from the bottom of the virtual wall), which further improves the control efficiency of the virtual actor.

In one embodiment, the method further includes: controlling, in response to the second move operation instruction executed on the target virtual actor, the target virtual actor to climb on the target virtual wall in a climb direction indicated by the second move operation instruction; detecting whether a position of the target virtual actor reaches a hanging position, during or at the end of controlling the target virtual actor to climb in the climb direction indicated by the second move operation instruction, wherein the hanging position allows the target virtual actor to hang; and controlling the target virtual actor to hang at the hanging position, when it is detected that the position of the target virtual actor reaches the hanging position.

As an implementation, the method further includes:

controlling, in the target game application, in response to a third move operation instruction executed on the target virtual actor, the target virtual actor to climb on the target virtual wall in a climb direction indicated by the third move operation instruction, where the climb direction indicated by the third move operation instruction includes the diagonal upward direction or upward direction (e.g., straight upward direction).

detecting whether the position of the target virtual actor reaches a preset hanging position or not, during or at the end of controlling the target virtual actor to climb in the climb direction indicated by the third move operation instruction.

controlling, in the target game application, the target virtual actor to hang at the hanging position, when it is detected that the position of the target virtual actor reaches the hanging position.

In this embodiment, the target virtual actor can be controlled in the target game application to climb on the target virtual wall in the upward or diagonal upward climb direction, until the target virtual actor reaches the hanging position. The target virtual actor is controlled to hang at the hanging position, when it is detected that the position of the target virtual actor reaches the hanging position.

Figure 16:
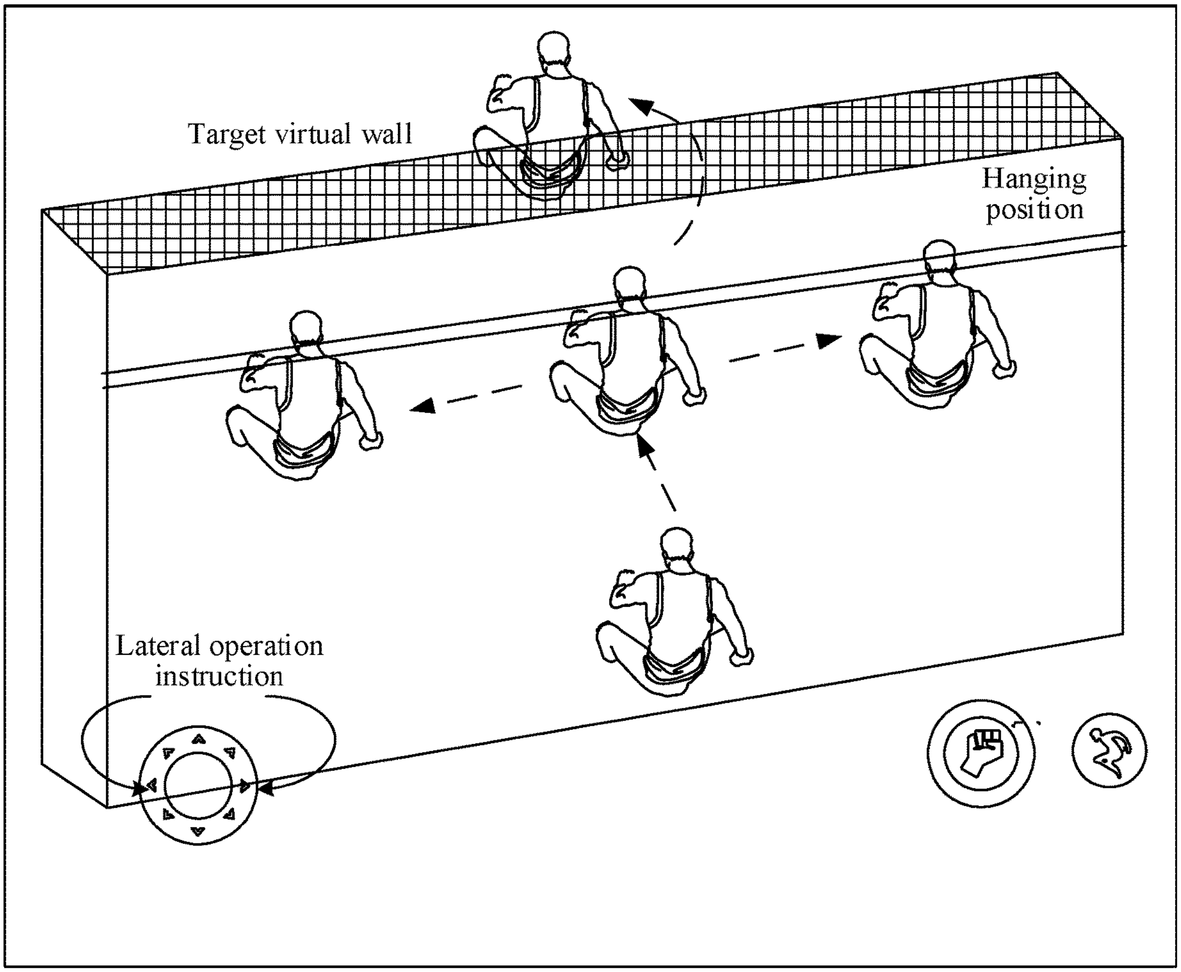
FIG. 16 is a schematic diagram of another controlling method of a virtual actor according to an embodiment of the present disclosure.

For example, FIG. 16 is a schematic diagram of another controlling method of a virtual actor according to an embodiment of the present disclosure. As shown in FIG. 16, the game screen includes a target virtual actor and a target virtual wall.

The target virtual actor is controlled to climb on the target virtual wall in the upward direction, when the target virtual actor is located on the target virtual wall; The target virtual actor is controlled in the target game application to hang at the hanging position, when it is detected that the position of the target virtual actor reaches the hanging position.

As an implementation, the method further includes:

controlling in the target game application, in response to the lateral-move operation instruction executed on the target virtual actor, the target virtual actor to move laterally in a preset hanging position region, when the target virtual actor is hanged at the hanging position, where the hanging position region comprises a plurality of hanging positions.

As an implementation, the method further includes:

controlling in the target game application, in response to a third operation instruction executed on the target virtual actor, the target virtual actor to perform a third jump action upwards, when the target virtual actor is hanged at the hanging position, where the third operation instruction includes the jump operation instruction, or the upward-move operation instruction, or the diagonal upward-move operation instruction.

displaying in the target game application, the target virtual actor standing on the top of the target virtual wall, when the target virtual actor reaches the top of the target virtual wall after performing the third jump action upwards.

controlling in the target game application, the target virtual actor to fall off the target virtual wall, when the target virtual actor does not reach the top of the target virtual wall after performing the third jump action upwards.

For example, as shown in FIG. 16, the game screen includes the target virtual actor and the target virtual wall.

The target virtual actor is controlled in the target game application, in response to the lateral-move operation instruction executed on the target virtual actor, to move laterally in the preset hanging position region, when the target virtual actor is located on the target virtual wall.

Alternatively, the target virtual actor is controlled in the target game application, in response to the third operation instruction executed on the target virtual actor, to perform the third jump action upwards, when the target virtual actor is located on the target virtual wall, and the target virtual actor standing on the top of the target virtual wall is displayed in the target game application when the target virtual actor reaches the top of the target virtual wall after performing the third jump action upwards.

The present disclosure will be further explained below in combination with specific embodiments:

In multi-player BR (Battle Royal) games, by calculating the angle between the target virtual actor and the normal line of the virtual wall and the distance between the target virtual actor and the virtual wall in real time, it is implemented that the player controls the actor to make wide-range movement on the virtual wall, thus breaking the limit of bone animation displacement, enhancing the scene interaction in the game application, and reducing the difficulty of team cooperation.

Details are provided as follows.

1. The Way the Target Virtual Actor Enters Climb:

Only a master control terminal can be triggered. When the climb speed is less than or equal to 0, the capsule detection will be performed the target virtual actor. The detection distance is the horizontal move distance of the target virtual actor when the climb is over, which is to ensure that the detection distance can normally detect the climb end state when it is detected that the target virtual actor enters the climb state, such that the target virtual actor can directly enter the climb end state in some cases. During the falling process of the target virtual actor, last key acceleration is recorded as the direction of the capsule detection, which is to prevent that the climb cannot be triggered if the target virtual actor encounters an object during the falling process and the speed is not less than or equal to 0, and the horizontal speed will be offset due to encountering the object, so the above-mentioned climb detection scheme cannot be adopted, and detection only can be performed actively according to the last key acceleration.

If an obstacle is detected, whether the target virtual actor can enter the climb end state or not is first judged, and then whether the target virtual actor can enter the climb state or not is judged. The climb end state may indicate that the target virtual actor has climbed over a wall. In one example, it may indicate that the target virtual actor has reached to a top of the wall and climbed over. In another example, when a wall is not tall enough for climbing, the target virtual actor does not need to enter the climb state, and can directly climb over the wall.

2. An Operation Method of the Target Virtual Actor to Enter the Climb State:

A move joystick in the target game application is continuously pushed up. When the distance between the target virtual actor and the target virtual wall is less than the detection distance, the target virtual actor can enter the climb state, and at the same time, a corresponding climb action is played.

3. An Operation Method of the Target Virtual Actor to Enter Hang:

When the target virtual actor is within a certain distance range before the climb is over, the move joystick is released. At this time, the target virtual actor will hang at a position (called the hanging position) where the climb is over, and at the same time, a hang action is played. In the embodiment, the hanging position is a position determined in real time according to the data of the virtual wall (height, and the collision between the capsule of the actor and the virtual wall) during the climb process of the target virtual actor. Different target virtual actors may include, but are not limited to, configuring different climb moves.

4. Judgment Conditions for Entering Climb:

When a falling distance (e.g., FallingToClimbOverDistance) is greater than a distance threshold, the system may start to monitor a duration since the virtual actor reaches the ground. When the duration after falling to the ground/surface from the air is greater than the cool-down time (CD) of FallingToClimbOverDistance, it is allowed to enter the climb state again. This can prevent easy entry into the climb or climb over (e.g., due to a wall being too low to climb). When the CD time is over, the target virtual actor has fallen to the ground since the last climb and is able to enter the climb state.

Currently, if components (such as building components or collision components) or actors in a scenario detected with the ray are not labeled with a tag of NoClimb, these components or actors can both enter climb.

The Z value of the normal vector of the virtual wall is less than MaxClimbZNormalVaule to avoid that the virtual wall is excessively tilted. The angle between the horizontal direction of the target virtual actor and the horizontal direction of the normal vector of the virtual wall is less than MaxFacingWallAngle, or less than AutoClimbMaxFacingWallAngle during automatic climb, that is, it is guaranteed that the target virtual actor faces the virtual wall. The angle between the key input direction of the target virtual actor and the virtual wall needs to be less than MaxVelocityWallAngle, and the distance of obstacle jump at AutoClimbMaxVelocityWallAngle needs to be greater than a distance for completing the climb. The distance of obstacle jump refers to an obstacle height during the climb process, which is used for judging a protruding collision body on the virtual wall.

5. Climb Failure Conditions:

The normal line of the virtual wall is too large, total climb distance is less than the ClimbLimitHeight, and the Z-axis direction speed is less than the ClimbEndSpeed, and is not under the cool-down time (CD) of the little jump. The total climb distance is greater than or equal to the ClimbLimitHeight+FinalJumpHeight. It is in climb and little jump and the Z-axis direction speed is less than 0 (start to fall). No obstacles can be detected, and no other objects can be detected when the capsule detection is performed in front of the target virtual object. The displacement distance of climb is MaxClimbStepHeight for which the target virtual object can cross over during wall climbing.

During processing of the climb of the target virtual object, whether the target virtual actor is in air, or in climb over/end state, or is performing climb move is judged in each frame.

Figure 17:
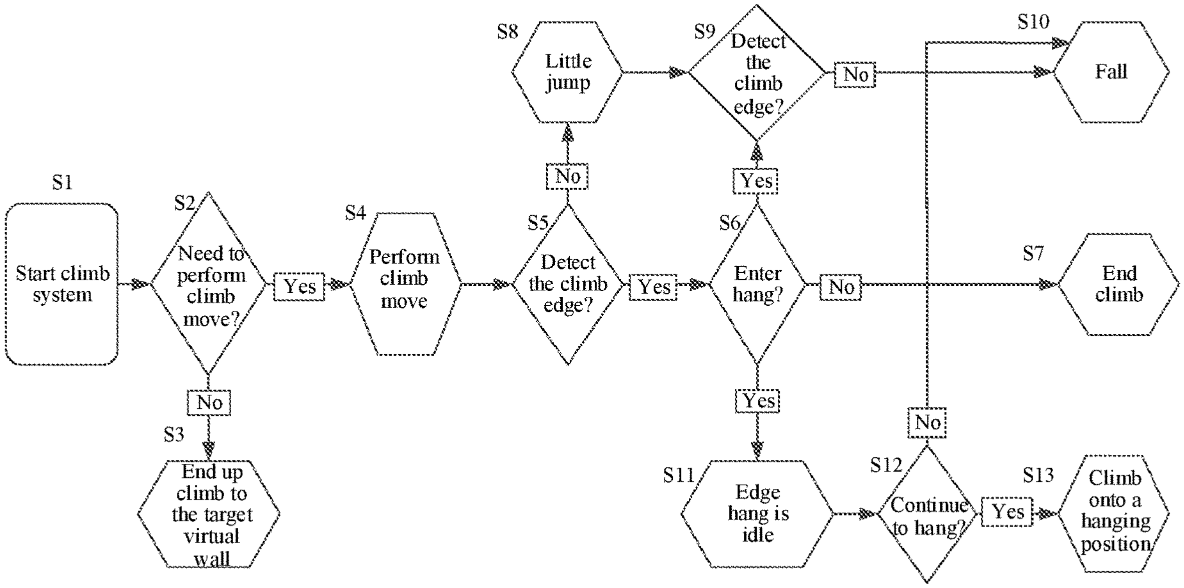
FIG. 17 is a schematic diagram of another controlling method of a virtual actor according to an embodiment of the present disclosure.

For example, FIG. 17 is a schematic diagram of another controlling method of a virtual actor according to an embodiment of the present disclosure. As shown in FIG. 17, the method includes, but is not limited to, the following steps S1 to S13:

- S1: Start ClimbSystem;
- S2: Judge whether to need climb move;
- S3: End up climb to the target virtual wall (ClimbEndUpToWall) when a judgment result in S2 is no;
- S4: Perform climb move when the judgment result in S2 is yes;
- S5: Judge whether to detect the climb edge;
- S6: Judge whether to enter Hang when a judgment result in S5 is yes;
- S7: End climb (Climb End) when a judgment result in S6 is no;
- S8: The little jump corresponds to the aforementioned second jump action, when the judgment result in S5 is no;
- S9: Judge whether to detect the climb edge;
- S10: Perform step S6 when the judgment result of S5 is yes, otherwise, fall, which corresponds to the aforementioned jumping off the virtual wall;
- S11: Hang edge is idle (Edge Hang Idle) when the judgment result of S6 is yes;
- S12: Determine whether to continue to hang; and
- S13: Fall when a judgment result of S12 is no, which corresponds to the aforementioned jumping off the virtual wall, otherwise, climb onto the hanging position (ClimbHangingEnd).

Figure 18:
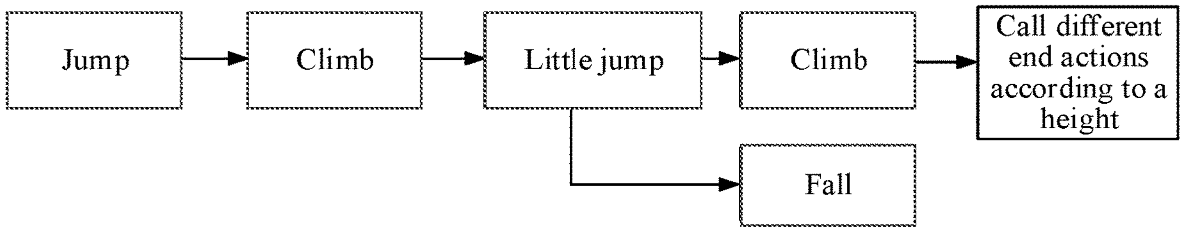
FIG. 18 is a schematic diagram of another controlling method of a virtual actor according to an embodiment of the present disclosure.

For example, FIG. 18 is a schematic diagram of another controlling method of a virtual actor according to an embodiment of the present disclosure. As shown in FIG. 18, the method includes, but is not limited to, the following steps:

- S1: Jump, which corresponds to the aforementioned first operation instruction;
- S2: Climb, which corresponds to the aforementioned second operation instruction;
- S3: Little jump, which corresponds to the aforementioned second jump action;
- S4-1: Climb, which corresponds to the aforementioned second operation instruction;
- S4-1-1: Call different end actions according to the height (for example, standing on the top of the virtual wall); and
- S4-2: Fall, which corresponds to the aforementioned jumping off the target virtual wall.

Calculation of hang point position upon completion of the climb (climb over):

1) Multiply an actor capsule position minus an actor's horizontal direction vector by ClimbOverHorizontalCheckDistance when the climb is over, where the ClimbOverHorizontalCheckDistance is a configured value, which is used for judging detection of horizontal move after climbing to the top of the virtual wall.

2) Then subtract HangingVerticalDistance and capsule half height from the actor's current displacement height

```
FVectorCharacterForward=CharacterOwner→
  GetActorForwardVector( ).GetSafeNormal2D( );
  CharacterForward*=(ClimbOverHorizontalCheckDistance);
  FVector HangingPoint=ClimbEndPoint−CharacterForward;
  HangingPoint.Z−=HangingVerticalDistance;
  HangingPoint.Z−=PawnHalfHeight;
```

The calculation of the climb state can ensure that the own action state of the actor can be changed at any time, which can bring more flexible operation and displacement space to the game application.

To simplify the description, the foregoing various method embodiments are described as a series of action combination. But persons of ordinary skill in the art may know that the present disclosure is not limited to any described sequence of the action, as some steps can adopt other sequences or can be performed simultaneously according to the present disclosure. In addition, persons skilled in the art may also know that the related actions and modules in the embodiments described in the specification are not necessarily mandatory to the present disclosure.

Figure 19:
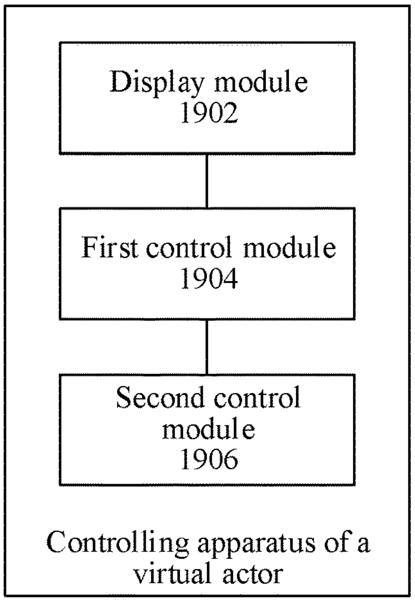
FIG. 19 is a structural schematic diagram of a controlling apparatus of a virtual actor according to an embodiment of the present disclosure.

According to another aspect of this embodiment of the present disclosure, there is further provided a controlling apparatus of a virtual actor, configured to implement the above-mentioned controlling method of the virtual actor. As shown in FIG. 19, the apparatus includes:

a display module 1902, configured to display a game screen, the game screen including a target virtual actor and a target virtual wall;

a first control module 1904, configured to control, in response to a first operation instruction executed on the target virtual actor, the target virtual actor to climb onto the target virtual wall, when the target virtual actor faces the target virtual wall, and the distance between the target virtual actor and the target virtual wall is less than a first threshold; and a second control module 1906, configured to control, in response to a second operation instruction executed on the target virtual actor, the target virtual actor to climb on the target virtual wall in a climb direction indicated by the second operation instruction, when the target virtual actor is located on the target virtual wall.

As an implementation, the first control module 1904 includes:

a first control unit, configured to control in the target game application, in response to a jump operation instruction executed on the target virtual actor, the target virtual actor to climb onto the target virtual wall, where the first operation instruction includes the jump operation instruction, the jump operation instruction being used for instructing the target virtual actor to perform a first jump action; or a second control unit, configured to control in the target game application, in response to a first move operation instruction executed on the target virtual actor, the target virtual actor to climb onto the target virtual wall, where the first operation instruction includes the first move operation instruction, the first move operation instruction being used for instructing the target virtual actor to move towards the target virtual wall; or a third control unit, configured to control in the target game application, in response to the jump operation instruction and the first move operation instruction executed simultaneously on the target virtual actor, the target virtual actor to climb onto the target virtual wall, where the first operation instruction includes the jump operation instruction and the first move operation instruction, the jump operation instruction and the first move operation instruction being used for instructing the target virtual actor to perform the first jump action in the direction of the target virtual wall.

As an implementation, the apparatus is further configured to:

Display in the target game application, a climb state identifier when the target virtual actor faces the target virtual wall, and the distance between the target virtual actor and the target virtual wall is less than the first threshold, where the climb state identifier indicates that the target virtual actor is in a state of being allowed to climb the target virtual wall.

As an implementation, the second control module 1906 further includes:

a fourth control unit, configured to control in the target game application, in response to a second move operation instruction executed on the target virtual actor, the target virtual actor to climb on the target virtual wall in a climb direction indicated by the second move operation instruction, where the second move operation instruction includes the second move operation instruction.

As an implementation, the fourth control unit is configured to control in the target game application, in response to the second move operation instruction executed on the target virtual actor, the target virtual actor to climb on the target virtual wall in the direction indicated by the second move operation instruction in the following ways: controlling, in the target game application, in response to the lateral-move operation instruction executed on the target virtual actor, the target virtual actor to climb on the target virtual wall in a lateral direction indicated by the lateral-move operation instruction, where the second move operation instruction includes the lateral-move operation instruction, and when the target virtual actor climbs in the lateral direction indicated by the lateral-move operation instruction, the height of the target virtual actor from virtual ground remains unchanged, the virtual ground being contacted with the bottom of the target virtual wall; or controlling, in the target game application, in response to the diagonal upward-move operation instruction executed on the target virtual actor, the target virtual actor to climb on the target virtual wall in the diagonal upward direction indicated by the diagonal upward-move operation instruction, where the second move operation instruction includes the diagonal upward-move operation instruction, and when the target virtual actor climbs in the diagonal upward direction indicated by the diagonal upward-move operation instruction, the height of the target virtual actor from the virtual ground becomes larger; or controlling, in the target game application, in response to the upward-move operation instruction executed on the target virtual actor, the target virtual actor to climb on the target virtual wall in the upward direction indicated by the upward-move operation instruction, where the second move operation instruction includes the upward-move operation instruction, and when the target virtual actor climbs in the upward direction indicated by the upward-move operation instruction, the height of the target virtual actor from the virtual ground becomes larger.

As an implementation, the apparatus is further configured to: acquire the climb stop duration of the target virtual actor when the target virtual actor is located on the target virtual wall, where the climb stop duration is the duration of the target virtual actor stops on the target virtual wall; control in the target game application, the target virtual actor to fall off the target virtual wall, when the climb stop duration reaches a second threshold.

As an implementation, the apparatus is further configured to: control in the target game application, in response to a diagonal downward-move operation instruction executed on the target virtual actor, the target virtual actor to fall off the target virtual wall, when the target virtual actor is located on the target virtual wall, where a move direction indicated by the diagonal downward-move operation instruction is a diagonal downward direction; or control in the target game application, in response to the downward-move operation instruction executed on the target virtual actor, the target virtual actor to fall off the target virtual wall, when the target virtual actor is located on the target virtual wall, where a move direction indicated by the downward-move operation instruction is a downward direction; or control in the target game application, in response to a jump operation instruction executed on the target virtual actor, the target virtual actor to fall off the target virtual wall, when the target virtual actor is located on the target virtual wall.

As an implementation, the apparatus is further configured to: acquire the climb height of the target virtual actor on the target virtual wall when the target virtual actor is located on the target virtual wall; control in the target game application, in response to the upward-move operation instruction or diagonal upward-move operation instruction executed on the target virtual actor, the target virtual actor to perform the second jump action upwards, when the climb height reaches the third threshold; display in the target game application, the target virtual actor standing on the top of the target virtual wall, when the target virtual actor reaches the top of the target virtual wall after performing the second jump action upwards; and control in the target game application, the target virtual actor to fall off the target virtual wall, when the target virtual actor does not reach the top of the target virtual wall after performing the second jump action upwards.

As an implementation, the apparatus is further configured to: acquire the fall-to-the-ground duration of the target virtual actor after it falls to the virtual ground, after control in the target game application, the target virtual actor to fall off the target virtual wall; set the target virtual actor to be forbidden from climbing onto the target virtual wall, when the fall-to-the-ground duration does not reach a fourth threshold; and set the target virtual actor to be allowed to climb onto the target virtual wall, when the fall-to-the-ground duration reaches a fourth threshold.

As an implementation, the apparatus is further configured to: detect whether the target virtual actor collides with the target virtual wall, during the process of target virtual actor falling; control in the target game application, the target virtual actor to catch at a collision location the target virtual wall, when it is detected that the target virtual actor collides with the target virtual wall.

As an implementation, the apparatus is further configured to: control in the target game application, in response to a third move operation instruction executed on the target virtual actor, the target virtual actor to climb on the target virtual wall in a climb direction indicated by the third move operation instruction, where the climb direction indicated by the third move operation instruction includes the diagonal upward direction or upward direction; detect whether the position of the target virtual actor reaches a preset hanging position or not, during or at the end of controlling the target virtual actor to climb in the climb direction indicated by the third move operation instruction; and control in the target game application, the target virtual actor to hang at the hanging position, when it is detected that the position of the target virtual actor reaches the hanging position.

As an implementation, the apparatus is further configured to: control in the target game application, in response to the lateral-move operation instruction executed on the target virtual actor, the target virtual actor to move laterally in a preset hanging position region, when the target virtual actor is hanged at the hanging position, where each of hanging positions in the hanging position region is a position that allows the target virtual actor to hang.

As an implementation, the apparatus is further configured to: control in the target game application, in response to a third operation instruction executed on the target virtual actor, the target virtual actor to perform a third jump action upwards, when the target virtual actor is hanged at the hanging position. In some embodiments, the third operation instruction includes the jump operation instruction, or the upward-move operation instruction, or the diagonal upward-move operation instruction; display in the target game application, the target virtual actor standing on the top of the target virtual wall, when the target virtual actor reaches the top of the target virtual wall after performing the third jump action upwards; and control in the target game application, the target virtual actor to fall off the target virtual wall, when the target virtual actor does not reach the top of the target virtual wall after performing the third jump action upwards.

According to yet another aspect of this embodiment of the present disclosure, there is further provided a computer-readable storage medium, the computer-readable storage medium storing a computer program therein, where the computer program is set to perform the above-mentioned controlling method of the virtual actor at runtime.

Figure 20:
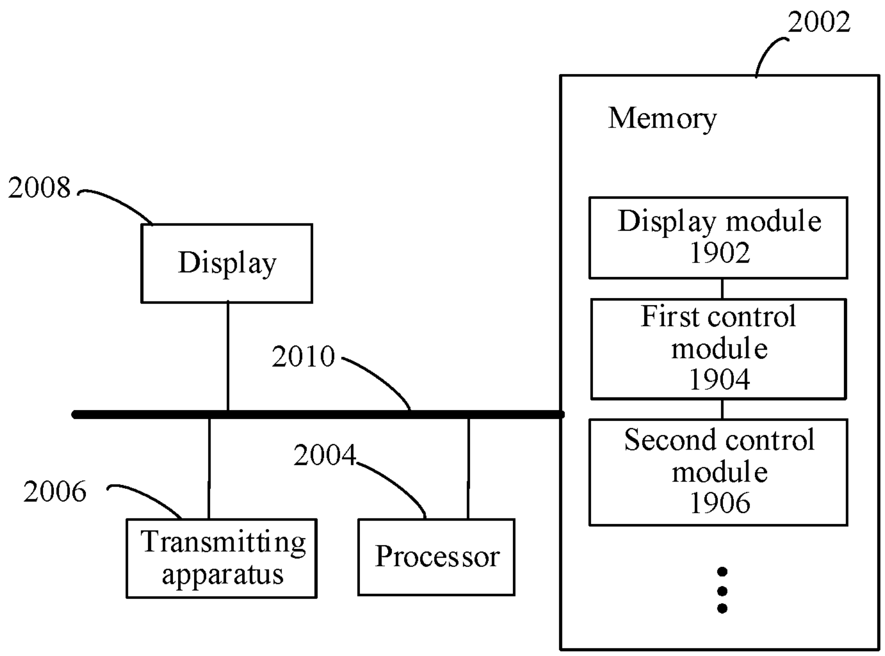
FIG. 20 is a structural schematic structural diagram of an electronic device according to an embodiment of the present disclosure.

According to another aspect of this embodiment of the present disclosure, there is further provided an electronic device for implementing the above-mentioned controlling method of the virtual actor. The electronic device may be a terminal device or a server as shown in FIG. 1. It is illustrated with taking the electronic device as an example in this embodiment. As shown in FIG. 20, the electronic device includes a memory 2002 and a processor 2004, the memory 2002 storing a computer program, the processor 2004 being set to perform the steps in any of the method embodiments by the computer program.

In this embodiment, the above-mentioned electronic device can be located in at least one of multiple network devices of a computer network.

Those of ordinary skilled in the art can understand that the structure shown in FIG. 20 is only illustrative, and the electronic device may also be terminal devices such as smart phones (such as an Android mobile phone and an iOS mobile phones), tablets, hand-held computers and mobile Internet devices (MID) and PAD. FIG. 20 does not limit the structure of the above-mentioned electronic device. For example, the electronic device may also include more or fewer components (such as a network interface) than shown in FIG. 20, or have a different configuration than shown in FIG. 20.

The memory 2002 can be configured to store software programs and modules, such as program instructions/modules corresponding to the controlling method and apparatus of the virtual actor in this embodiment of the present disclosure, and the processor 2004 executes various functional applications and data processing by running the software programs and modules stored in the memory 2002, that is, the above-mentioned controlling method of the virtual actor. The memory 2002 may include a high-speed random access memory, and may further include a non-volatile memory, such as one or more magnetic storing apparatuses, a flash memory, or other non-volatile solid-state memories. In some examples, the memory 2002 may further include memories provided remotely relative to the processor 2004, which may be connected to a terminal via a network. Examples of the above-mentioned network include, but are not limited to, the Internet, intranet, a local area network, a mobile communication network and a combination thereof. The memory 2002 specifically can be configured to store, but is not limited to, information about the target virtual actor, the target virtual wall and the like. As an example, as shown in FIG. 20, the above-mentioned memory 2002 may include, but is not limited to, the display module 1902, the first control module 1904 and the second control module 1906 in the above-mentioned controlling apparatus of the virtual actor. Furthermore, it may further include, but is not limited to, other module units in the above-mentioned controlling apparatus of the virtual actor, which will not be repeated in this example.

In the embodiment, the above-mentioned transmitting apparatus 2006 is configured to receive or transmit data via a network. The specific examples of the above-mentioned network may include wired networks and wireless networks. In one example, the transmitting apparatus 2006 includes a network interface controller (NIC), which can be connected with other network devices and routers through network cables to communicate with the Internet or local area network. In one example, the transmitting apparatus 2006 is a radio frequency (RF) module, configured to communicate with the Internet wirelessly.

Furthermore, the above-mentioned electronic device further includes: a display 2008, configured to display the above-mentioned game screen; and a connection bus 2010, configured to connect various module components in the above-mentioned electronic device.

In other embodiments, the above-mentioned terminal device or server may be a node in a distributed system, where the distributed system may be a blockchain system, and the blockchain system may be a distributed system formed by connecting multiple nodes in manner of network communication. The nodes can form a peer to peer (P2P) network, and any form of computing device, such as a server, a terminal and other electronic devices, can become a node in the blockchain system by joining the peer-to-peer network.

According to one aspect of the present disclosure, there is provided a computer program product or computer program, the computer program product or computer program including a computer instruction, the computer instruction being stored in a computer-readable storage medium. The processor of the computer device reads the computer instruction from the computer-readable storage medium, and the processor executes the computer instruction, such that the computer device performs the method provided in various implementations of the above-mentioned control aspect of the virtual actor. The computer program is set to perform the steps in any of the above-mentioned method embodiments at runtime.

In this embodiment, the above-mentioned computer-readable storage medium may be set to store computer programs for performing the steps of the above-mentioned controlling method of the virtual actor.

In this embodiment, those of ordinary skilled in the art can understand that all or part of the steps in various methods of the above-mentioned embodiments can be completed by instructing terminal device related hardware through a program, which can be stored in a computer-readable storage medium, which may include: a flash drive, a read-only memory (ROM), a random access memory (RAM), a magnetic disk, an optical disc, or the like.

The serial number of the above-mentioned embodiments of the present disclosure is only for description and does not represent the advantages and disadvantages of the embodiments.

If an integrated unit in the above-mentioned embodiment is implemented in the form of a software functional unit and sold or used as an independent product, it can be stored in the above-mentioned computer-readable storage medium. Based on such an understanding, the technical solutions of the present disclosure essentially, or the part contributing to the related art, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of the present disclosure.

In the above-mentioned embodiments of the present disclosure, the description of each embodiment has its own emphasis. For the part not detailed in some embodiments, refer to the relevant description of other embodiments.

In several embodiments provided in the present disclosure, it is to be understood that the disclosed client can be implemented by other means. The apparatus embodiments described above are only schematic. For example, partitioning of units is only logical functional partitioning. In actual implementation, there may be other partitioning methods. For example, multiple units or components can be combined or integrated into another system, or some features can be ignored or not executed. From another point, coupling or direct coupling or communication connection between each other shown or discussed may be indirect coupling or communication connection via some interfaces, units or modules, and may be electrical or other forms.

The units described as separate components can be or cannot be physically separated, and the components displayed as units may be or may not be physical units, that is, they can be located in one place, or they can be distributed onto multiple network units. Some or all of the units can be selected according to the actual needs to achieve the purpose of this embodiment solution.

In addition, all functional units in all the embodiments of the present disclosure can be integrated in one processing unit, or all the units can exist physically alone, or two or more units can be integrated in one unit. The above-mentioned integrated units can be implemented in the form of hardware or software functional units.

The above is only the implementation of the present disclosure. For those of ordinary skilled in the art, without departing from the principles of the present disclosure, several improvements and polishing can also be made, which are also considered as falling within the protection scope of the present disclosure.

What is claimed is:

1. A controlling method of a virtual actor, applied to a target game application and performed by an electronic device, comprising:

displaying a game screen, the game screen comprising a target virtual actor and a target virtual wall;

controlling the target virtual actor to climb onto the target virtual wall, in response to a first operation instruction executed on the target virtual actor when the target virtual actor faces the target virtual wall and a distance between the target virtual actor and the target virtual wall is less than a first threshold; and controlling the target virtual actor to climb on the target virtual wall in a climb direction indicated by the second operation instruction, in response to a second operation instruction executed on the target virtual actor when the target virtual actor is located on the target virtual wall, wherein an angle between a horizontal direction of the target virtual actor and a horizontal direction of a normal vector of the target virtual wall is less than an angle threshold.

2. The method according to claim 1, wherein a slope of the target virtual wall is smaller than a maximum climb slope.

3. The method according to claim 1, further comprising:

displaying a climb state identifier when the target virtual actor faces the target virtual wall, wherein the climb state identifier indicates that the target virtual actor is in a state of being allowed to climb the target virtual wall.

4. The method according to claim 1, further comprising:

acquiring a climb stop duration of the target virtual actor when the target virtual actor is located on the target virtual wall, wherein the climb stop duration is a duration of the target virtual actor stops on the target virtual wall; and controlling the target virtual actor to fall off the target virtual wall, when the climb stop duration reaches a second threshold.

5. The method according to claim 1, further comprising:

controlling the target virtual actor to fall off the target virtual wall, in response to a jump-down operation instruction executed on the target virtual actor when the target virtual actor is located on the target virtual wall.

6. The method according to claim 1, further comprising:

acquiring the climb height of the target virtual actor on the target virtual wall when the target virtual actor is located on the target virtual wall;

controlling, in response to the second operation instruction executed on the target virtual actor when the climb height reaches a third threshold, the target virtual actor to perform a second jump action upwards;

displaying, the target virtual actor standing on the top of the target virtual wall, when the target virtual actor reaches the top of the target virtual wall after performing the second jump action upwards; and controlling, the target virtual actor to fall off the target virtual wall, when the target virtual actor does not reach the top of the target virtual wall after performing the second jump action upwards.

7. The method according to claim 5, further comprising:

after the target virtual actor falls off the target virtual wall, setting the target virtual actor to be forbidden from climbing until a climbing cooldown period is over.

8. The method according to claim 1, further comprising:

detecting whether the target virtual actor collides with the target virtual wall, during a process of the target virtual actor falling; and controlling, the target virtual actor to catch at a collision location on the target virtual wall, upon detecting that the target virtual actor collides with the target virtual wall.

9. The method according to claim 8, further comprising:

during the process of the target virtual actor falling, determining a direction of capsule detection for the target virtual actor according to an acceleration corresponding to a latest key press.

10. The method according to claim 1, further comprising:

controlling, in response to the second move operation instruction executed on the target virtual actor, the target virtual actor to climb on the target virtual wall in a climb direction indicated by the second move operation instruction;

detecting whether a position of the target virtual actor reaches a hanging position, during or at the end of controlling the target virtual actor to climb in the climb direction indicated by the second move operation instruction, wherein the hanging position allows the target virtual actor to hang; and controlling the target virtual actor to hang at the hanging position, when it is detected that the position of the target virtual actor reaches the hanging position.

11. The method according to claim 10, further comprising:

controlling, in response to a lateral-move operation instruction executed on the target virtual actor, the target virtual actor to move laterally in a hanging position region, when the target virtual actor is hanged at the hanging position, wherein the hanging position region comprises a plurality of hanging positions.

12. The method according to claim 1, further comprising:

controlling, in response to a third operation instruction executed on the target virtual actor, the target virtual actor to perform a third jump action upwards, when the target virtual actor is hanged at the hanging position;

displaying, the target virtual actor standing on a top of the target virtual wall, when the target virtual actor reaches the top of the target virtual wall after performing the third jump action upwards; and controlling, the target virtual actor to fall off the target virtual wall, when the target virtual actor does not reach the top of the target virtual wall after performing the third jump action upwards.

13. A controlling apparatus, comprising at least one memory and at least one processor, the at least one memory storing a computer program, and the at least one processor being configured to execute the computer program and perform:

displaying a game screen, the game screen comprising a target virtual actor and a target virtual wall;

controlling the target virtual actor to climb onto the target virtual wall, in response to a first operation instruction executed on the target virtual actor when the target virtual actor faces the target virtual wall and a distance between the target virtual actor and the target virtual wall is less than a first threshold; and controlling the target virtual actor to climb on the target virtual wall in a climb direction indicated by the second operation instruction, in response to a second operation instruction executed on the target virtual actor when the target virtual actor is located on the target virtual wall, wherein an angle between a horizontal direction of the target virtual actor and a horizontal direction of a normal vector of the target virtual wall is less than an angle threshold.

14. The apparatus according to claim 13, wherein a slope of the target virtual wall is smaller than a maximum climb slope.

15. The apparatus according to claim 13, wherein the at least one processor is further configured to perform:

displaying a climb state identifier when the target virtual actor faces the target virtual wall, and the distance between the target virtual actor and the target virtual wall is less than the first threshold, wherein the climb state identifier indicates that the target virtual actor is in a state of being allowed to climb the target virtual wall.

16. The apparatus according to claim 13, wherein the at least one processor is further configured to perform:

acquiring a climb stop duration of the target virtual actor when the target virtual actor is located on the target virtual wall, wherein the climb stop duration is a duration of the target virtual actor stops on the target virtual wall; and controlling the target virtual actor to fall off the target virtual wall, when the climb stop duration reaches a second threshold.

17. The apparatus according to claim 13, wherein the at least one processor is further configured to perform:

controlling the target virtual actor to fall off the target virtual wall, in response to a jump-down operation instruction executed on the target virtual actor when the target virtual actor is located on the target virtual wall.

18. A non-transitory computer-readable storage medium, the computer-readable storage medium comprising a stored program, the program, when executed by a terminal device or a computer, causing the terminal device or the computer to perform:

displaying a game screen, the game screen comprising a target virtual actor and a target virtual wall;

controlling the target virtual actor to climb onto the target virtual wall, in response to a first operation instruction executed on the target virtual actor when the target virtual actor faces the target virtual wall and a distance between the target virtual actor and the target virtual wall is less than a first threshold; and controlling the target virtual actor to climb on the target virtual wall in a climb direction indicated by the second operation instruction, in response to a second operation instruction executed on the target virtual actor when the target virtual actor is located on the target virtual wall, wherein an angle between a horizontal direction of the target virtual actor and a horizontal direction of a normal vector of the target virtual wall is less than an angle threshold.

* * * * *